(12) United States Patent
Iwasaki

(10) Patent No.: US 12,124,038 B2
(45) Date of Patent: Oct. 22, 2024

(54) IMAGE DISPLAY DEVICE AND DISPLAY DEVICE

(71) Applicant: SONY GROUP CORPORATION, Tokyo (JP)

(72) Inventor: Masanori Iwasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/264,283

(22) PCT Filed: Jan. 13, 2022

(86) PCT No.: PCT/JP2022/000927
§ 371 (c)(1),
(2) Date: Aug. 4, 2023

(87) PCT Pub. No.: WO2022/172677
PCT Pub. Date: Aug. 18, 2022

(65) Prior Publication Data
US 2024/0118546 A1 Apr. 11, 2024

(30) Foreign Application Priority Data
Feb. 12, 2021 (JP) ................................. 2021-020604

(51) Int. Cl.
*G02B 27/01* (2006.01)
*F21V 8/00* (2006.01)
(Continued)

(52) U.S. Cl.
CPC ........... *G02B 27/0172* (2013.01); *G02B 5/32* (2013.01); *G02B 6/0036* (2013.01);
(Continued)

(58) Field of Classification Search
CPC .... G02B 27/0172; G02B 5/32; G02B 6/0036; G02B 2/0103; G02B 27/0955; G02C 7/04; G02C 11/10
See application file for complete search history.

(56) References Cited

U.S. PATENT DOCUMENTS 11,103,763 B2 * 8/2021 Anton .................... A63B 7/002
11,141,645 B2 * 10/2021 Anton .................. A63B 1/0669
(Continued)

FOREIGN PATENT DOCUMENTS

JP 04-088312 A 3/1992
JP 2003-315727 A 11/2003
(Continued)

OTHER PUBLICATIONS

International Search Report and Written Opinion of PCT Application No. PCT/JP2022/000927, issued on Mar. 1, 2022, 12 pages of ISRWO.
(Continued)

Primary Examiner — Sejoon Ahn
(74) Attorney, Agent, or Firm — CHIP LAW GROUP

(57) ABSTRACT

To provide an image display device capable of improving display at a fovea of an eye, which is the most important part in a display range, such that display at the fovea of the eye is not darkened. There is provided an image display device including: at least one optical element unit including two optical elements facing each other, in which one optical element unit included in the at least one optical element unit includes a first optical element and a second optical element, an image is formed on the basis of image display light which transmits through the first optical element and is emitted to outside of the image display device, the first optical element has a deflection function of deflecting incident light which has a predetermined wavelength and is incident on the first optical element at a predetermined incidence angle to a side
(Continued)

of the first optical element on which the incident light is incident, and emits first diffracted light deflected by the deflection function, the second optical element has a lens function for the first diffracted light which has a predetermined wavelength and is incident on the second optical element at a predetermined incidence angle, and a direction of the incidence angle of the incident light and a direction of a diffraction angle of the first diffracted light are different from a direction of an optical axis of the second optical element.

19 Claims, 8 Drawing Sheets

(51) Int. Cl.
*G02B 5/32* (2006.01)
*G02B 27/09* (2006.01)
*G02C 7/04* (2006.01)
*G02C 11/00* (2006.01)

(52) U.S. Cl.
CPC ..... *G02B 27/0103* (2013.01); *G02B 27/0955* (2013.01); *G02C 7/04* (2013.01); *G02C 11/10* (2013.01)

(56) References Cited

U.S. PATENT DOCUMENTS

| | | | |
|---|---|---|---|
| 2015/0346490 A1 | 12/2015 | Tekolste et al. | |
| 2017/0248747 A1 | 8/2017 | Kim et al. | |
| 2020/0408969 A1* | 12/2020 | Yoon | G02B 5/18 |
| 2020/0409150 A1* | 12/2020 | Lee | G02B 7/02 |
| 2020/0409155 A1* | 12/2020 | Masuda | G02B 6/0035 |
| 2020/0409454 A1* | 12/2020 | Kühne | G06F 3/0484 |

FOREIGN PATENT DOCUMENTS

| | | |
|---|---|---|
| JP | 2005-148655 A | 6/2005 |
| JP | 2020-507113 A | 3/2020 |
| WO | 2018/190007 A1 | 10/2018 |
| WO | 2020/246256 A1 | 12/2020 |

OTHER PUBLICATIONS

Extended European Search Report of EP Application No. 22752510.2 issued on Jul. 2, 2024, 08 pages.

* cited by examiner

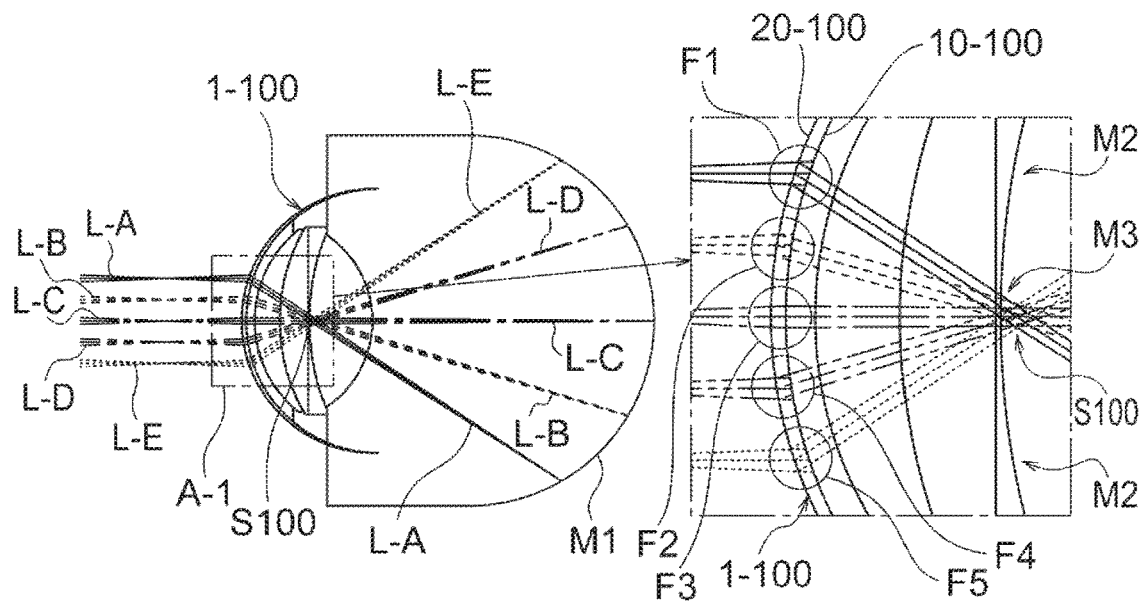
FIG. 1A
FIG. 1B
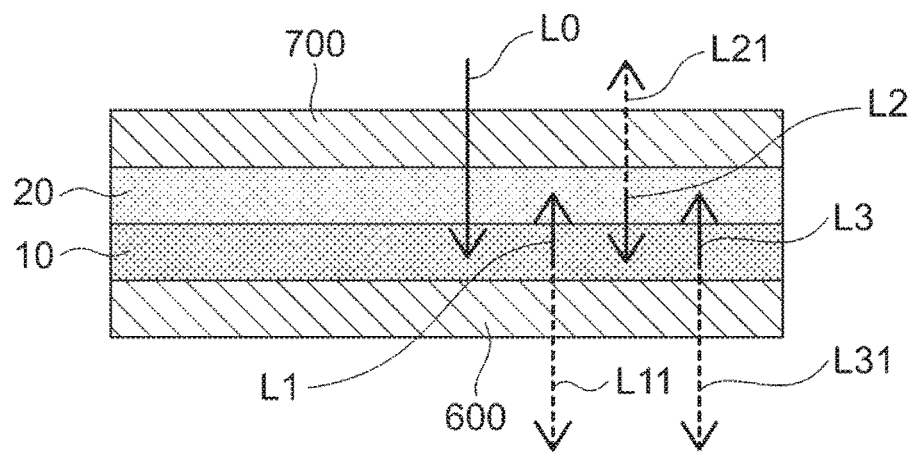
FIG. 2

FIG. 3

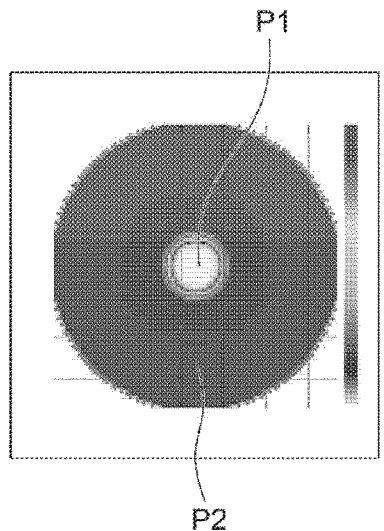

FIG. 4

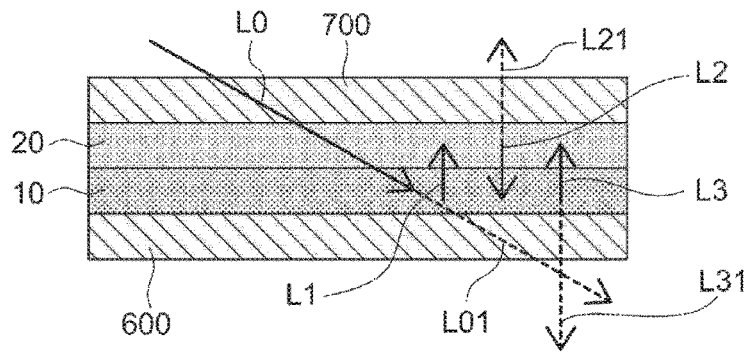

FIG. 5

| | DIFFRACTION EFFICIENCY | DIFFRACTED LIGHT | ZERO-ORDER LIGHT = TRANSMITTED LIGHT |
|---|---|---|---|
| FIRST INCIDENCE OF DEFLECTION HOE | 95% | 95% | 5% * STRAY LIGHT |
| FIRST INCIDENCE OF LENS HOE | 95% | 90% | 4.75% LEAKED LIGHT |
| SECOND INCIDENCE OF DEFLECTION HOE | 95% | 85.7% | 4.5% DESIGNED CL DISPLAY LIGHT |
| ... OF DEFLECTION HOE | 95% | ... | ... DESIGNED CL DISPLAY LIGHT |
| 100TH INCIDENCE OF DEFLECTION HOE | 95% | $95\%^{100}$ | INTEGRATION OF LIGHT TRANSMITTED THROUGH DEFLECTION HOE $\sum^{100} = 46.3\%$ = CL DISPLAY LIGHT |

| | HOE HAVING SUBSTANTIALLY REGULAR REFLECTION TYPE | HOE HAVING SUBSTANTIALLY REVERSE REGULAR REFLECTION TYPE |
|---|---|---|
| DIFFRACTION DIRECTION | SAME DIRECTION AS MIRROR | SAME DIRECTION AS REFERENCE LIGHT |
| ANGLE DEPENDENCE | LARGE | SMALL AND BROAD |
| WAVELENGTH DEPENDENCE | LARGE | VERY LARGE |
| DIFFRACTION EFFICIENCY | HIGH | VERY HIGH |

FIG. 8
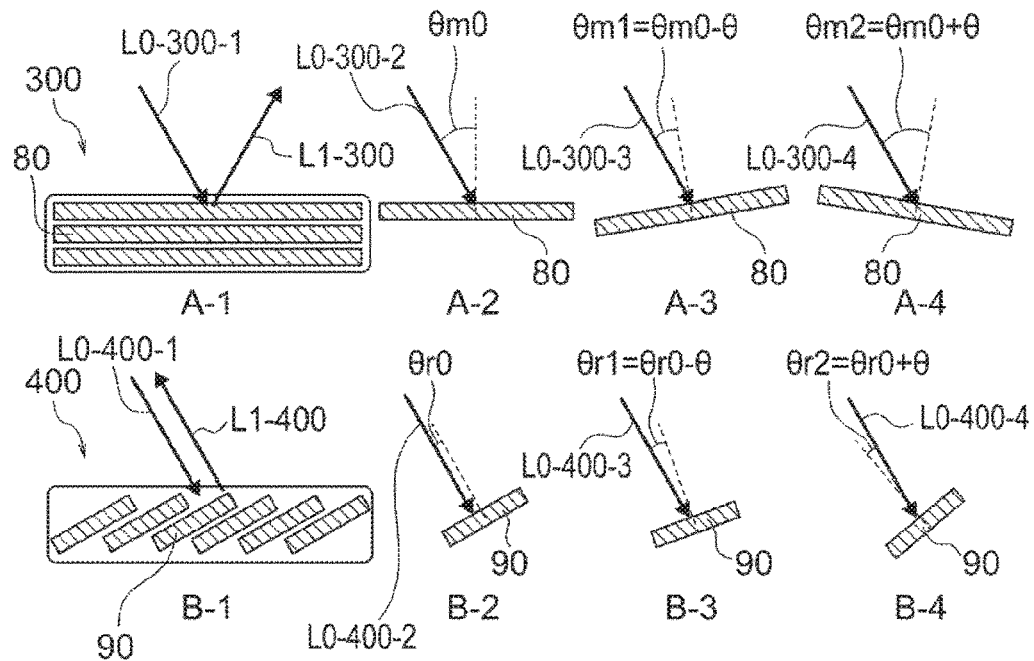
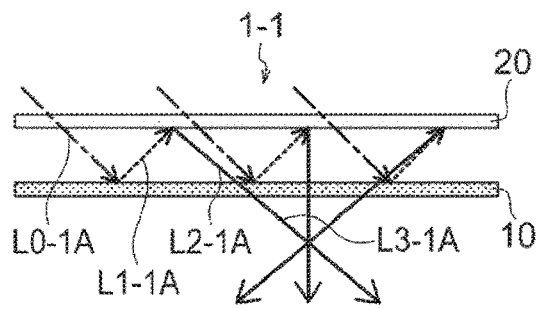
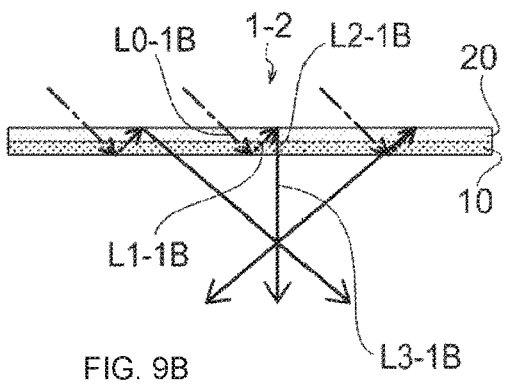
FIG. 9A   FIG. 9B
FIG. 10
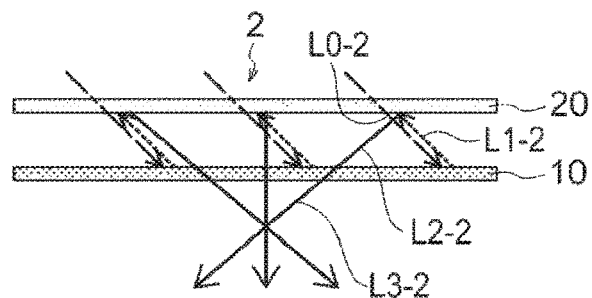

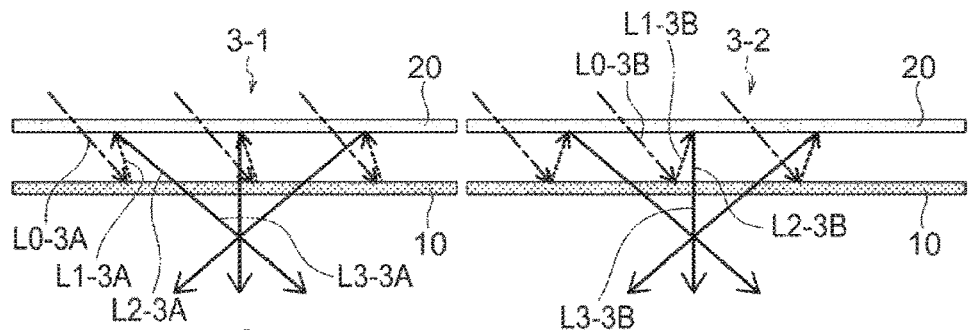
FIG. 11A   FIG. 11B
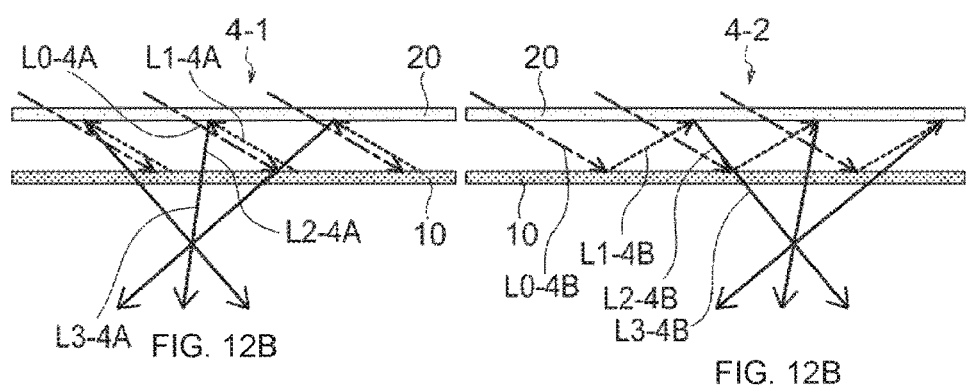
FIG. 12B   FIG. 12B
FIG. 13
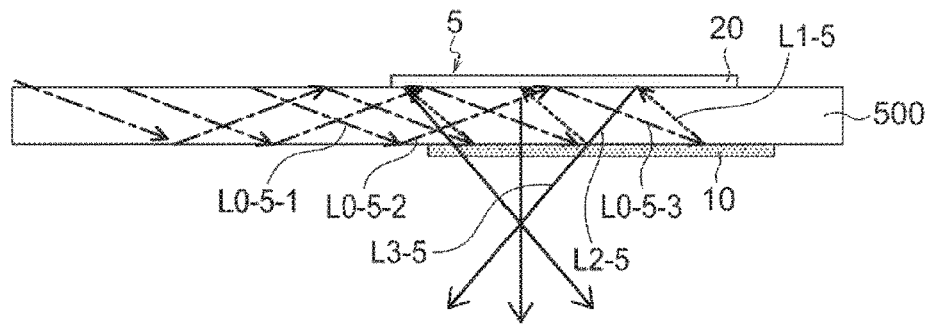
FIG. 14
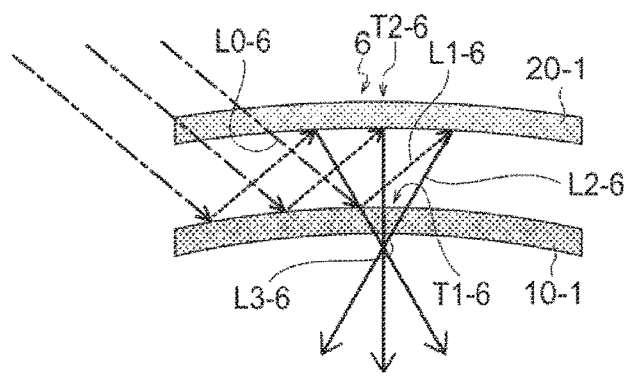

FIG. 19
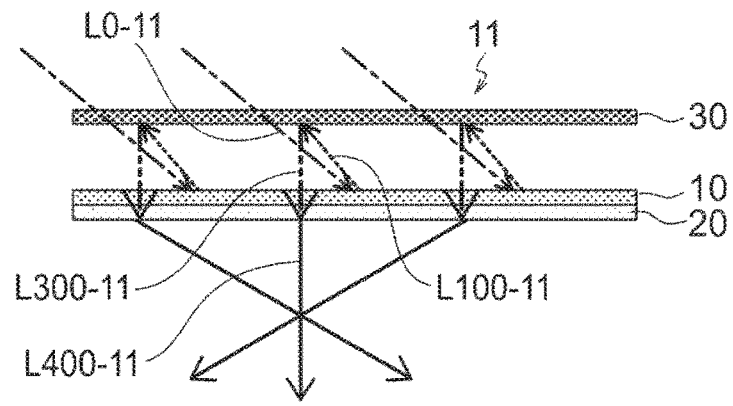
FIG. 20
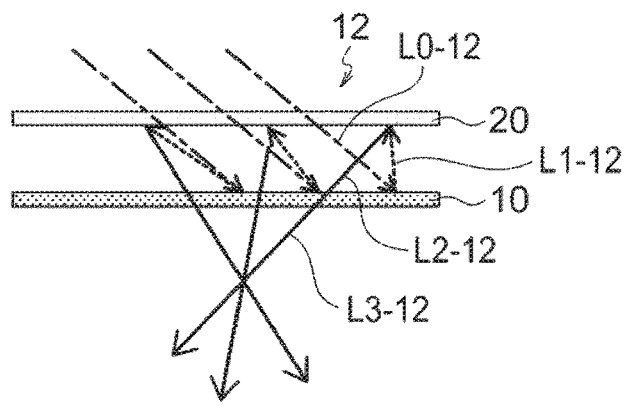
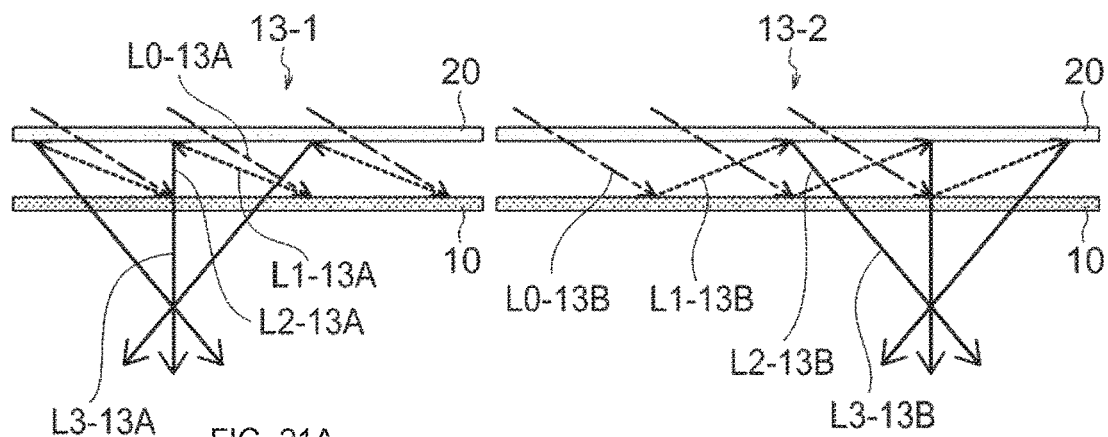
FIG. 21A　　　　FIG. 21B

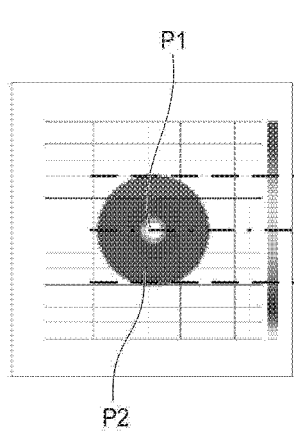
FIG. 22A
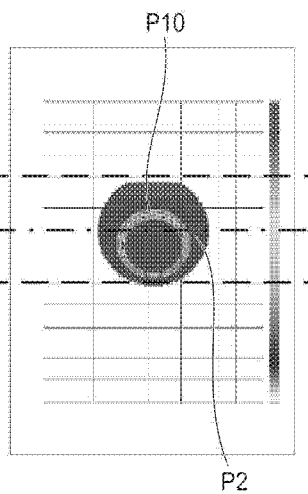
FIG. 22B
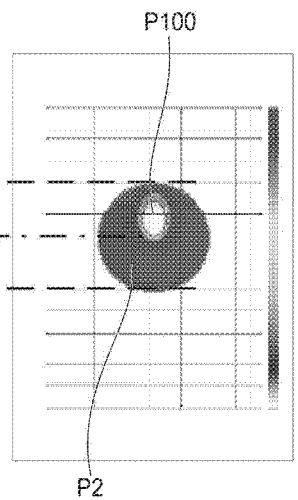
FIG. 22C
FIG. 23
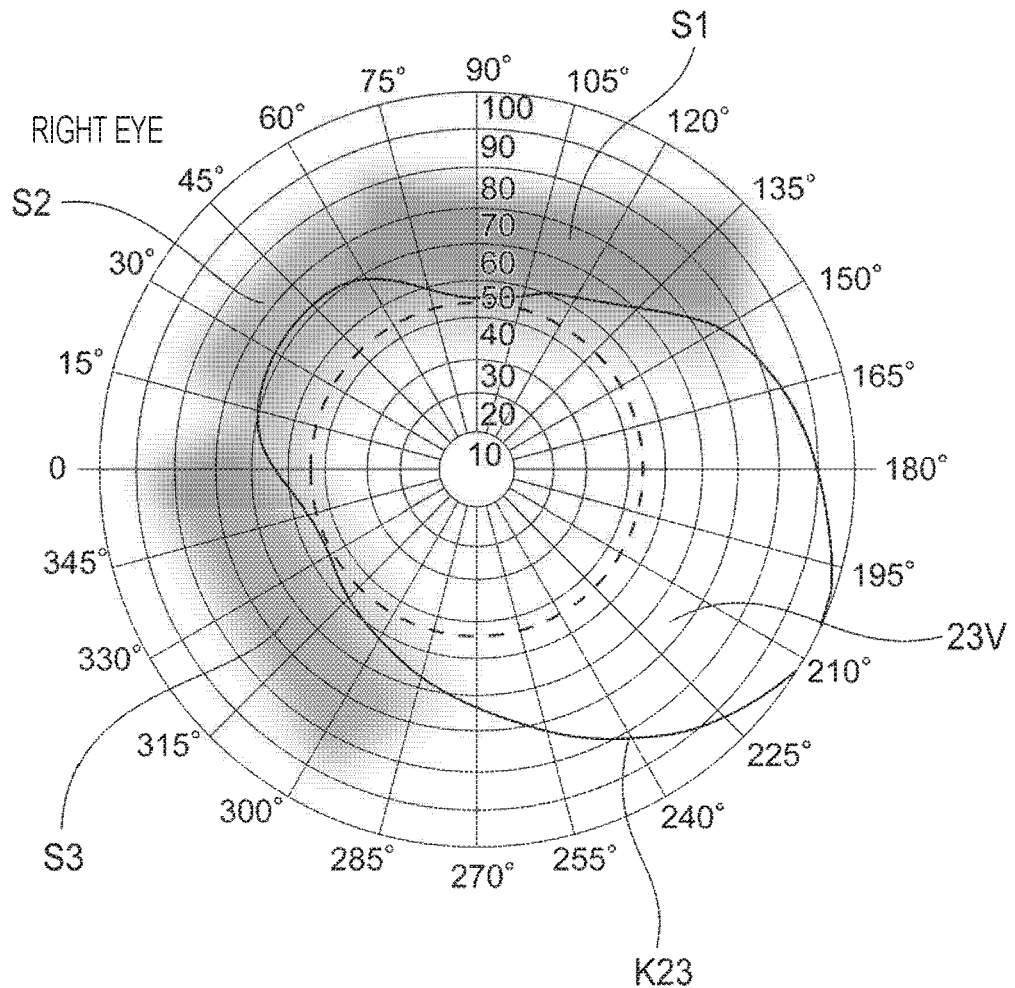

IMAGE DISPLAY DEVICE AND DISPLAY DEVICE

CROSS REFERENCE TO RELATED APPLICATIONS

This application is a U.S. National Phase of International Patent Application No. PCT/JP2022/000927 filed on Jan. 13, 2022, which claims priority benefit of Japanese Patent Application No. JP 2021-020604 filed in the Japan Patent Office on Feb. 12, 2021. Each of the above-referenced applications is hereby incorporated herein by reference in its entirety.

TECHNICAL FIELD

The present technology relates to an image display device and a display device.

BACKGROUND ART

In recent years, attention has been focused on technology of superimposing an image on a scene of an outside world. The present technology is also called augmented reality (AR) technology. One of products using this technology is a head-mounted display. The head-mounted display is used by being mounted on a head of a user. In an image display method using the head-mounted display, for example, when light from the head-mounted display reaches the user's eyes in addition to light from an outside world, the user recognizes an image of the light from the display as if the image were superimposed on an image of the outside world.

For example, Patent Document 1 proposes an image display device including a virtual image optical system in which contrast, light utilization efficiency, and see-through efficiency are improved.

CITATION LIST

Patent Document

Patent Document 1: Japanese Patent Application Laid-Open No. 2005-148655

SUMMARY OF THE INVENTION

Problems to be Solved by the Invention

However, in the technique proposed in Patent Document 1, there is a risk that display at a fovea of an eye, which is the most important part in a display range, becomes dark.

For this reason, the present technology has been made in view of such a situation, and a main object of the present technology is to provide an image display device and a display device including an image display device capable of improving display at the fovea of the eye, which is the most important part in a display range, such that display at the fovea of the eye is not darkened.

Solutions to Problems

As a result of intensive studies to solve the above object, the present inventors have surprisingly succeeded in improving display at the fovea of the eye, which is the most important part in a display range, such that display at the fovea of the eye is not darkened, and have completed the present technology.

That is, as a first aspect according to the present technology, there is provided an image display device including: at least one optical element unit including two optical elements facing each other, in which one optical element unit included in the at least one optical element unit includes a first optical element and a second optical element, an image is formed on the basis of image display light which transmits through the first optical element and is emitted to outside of the image display device, the first optical element has a deflection function of deflecting incident light which has a predetermined wavelength and is incident on the first optical element at a predetermined incidence angle to a side of the first optical element on which the incident light is incident, and emits first diffracted light deflected by the deflection function, the second optical element has a lens function for the first diffracted light which has a predetermined wavelength and is incident on the second optical element at a predetermined incidence angle, and a direction of the incidence angle of the incident light and a direction of a diffraction angle of the first diffracted light are different from a direction of an optical axis of the second optical element.

In the image display device of the first aspect according to the present technology, in a three-dimensional coordinate system, a normal line of the first optical element may be in a +z axis direction from an origin of the three-dimensional coordinate system, a surface of the first optical element may be an x-y plane, the incident light which is incident on the first optical element may be light which extends from a certain point within a second quadrant range, within a third quadrant range, or on a −x axis of an x-y coordinate system in the +z axis direction to the origin of the three-dimensional coordinate system, and the first diffracted light which is emitted from the first optical element may be light which extends from the origin of the three-dimensional coordinate system to a certain point within a first quadrant range, within a fourth quadrant range, on a +x axis, on a +y axis, or on a −y axis of the x-y coordinate system in the +z axis direction.

In the image display device of the first aspect according to the present technology, in a three-dimensional coordinate system, a normal line of the first optical element may be in a +z axis direction from an origin of the three-dimensional coordinate system, a surface of the first optical element may be an x-y plane, the incident light which is incident on the first optical element may be light which extends from a certain point within a first quadrant range, within a fourth quadrant range, or on a +x axis of an x-y coordinate system in the +z axis direction to the origin of the three-dimensional coordinate system, and the first diffracted light which is emitted from the first optical element may be light which extends from the origin of the three-dimensional coordinate system to a certain point within a second quadrant range, within a third quadrant range, on a −x axis, on a +y axis, or on a −y axis of the x-y coordinate system in the +z axis direction.

In the image display device of the first aspect according to the present technology, in a three-dimensional coordinate system, a normal line of the first optical element may be in a +z axis direction from an origin of the three-dimensional coordinate system, a surface of the first optical element may be an x-y plane, the incident light which is incident on the first optical element may be light which extends from a certain point within a second quadrant range, within a third quadrant range, or on a −x axis of an x-y coordinate system in the +z axis direction to the origin of the three-dimensional coordinate system, and the first diffracted light which is emitted from the first optical element may be light which extends from the origin of the three-dimensional coordinate system to a certain point within a second quadrant range, within a third quadrant range, or on a −x axis of the x-y coordinate system in the +z axis direction.

In the image display device of the first aspect according to the present technology, in a three-dimensional coordinate system, a normal line of the first optical element may be in a +z axis direction from an origin of the three-dimensional coordinate system, a surface of the first optical element may be an x-y plane, the incident light which is incident on the first optical element may be light which extends from a certain point within a first quadrant range, within a fourth quadrant range, or on a +x axis of an x-y coordinate system in the +z axis direction to the origin of the three-dimensional coordinate system, and the first diffracted light which is emitted from the first optical element may be light which extends from the origin of the three-dimensional coordinate system to a certain point within a first quadrant range, within a fourth quadrant range, or on a +x axis of the x-y coordinate system in the +z axis direction.

In the image display device of the first aspect according to the present technology, the first optical element may have a lens function for the incident light which has the predetermined wavelength and is incident on the first optical element at the predetermined incidence angle.

In the image display device of the first aspect according to the present technology, each of the first optical element and the second optical element may have a curved surface shape.

In the image display device of the first aspect according to the present technology, the first optical element and the second optical element may be disposed close to each other.

In the image display device of the first aspect according to the present technology, the first optical element and the second optical element may be disposed in contact with each other.

The image display device of the first aspect according to the present technology may further include a substrate, the substrate may be in contact with the first optical element, and light propagated within the substrate may be incident on the first optical element.

In the image display device of the first aspect according to the present technology, the substrate may be a light guide plate, and light reflected and propagated within the light guide plate may be incident on the first optical element.

In the image display device of the first aspect according to the present technology, the second optical element may have a deflection function of deflecting the first diffracted light which has a predetermined wavelength and is incident on the second optical element at a predetermined incidence angle to a side of the second optical element on which the first diffracted light is incident.

In the image display device of the first aspect according to the present technology, each of the incidence angle of the incident light which is incident on the first optical element and the diffraction angle of the first diffracted light which is emitted from the first optical element may be larger than a traveling angle of a light beam according to the second optical element having a lens function.

In the image display device of the first aspect according to the present technology, the second optical element may have a deflection function of deflecting the first diffracted light which has a predetermined wavelength and is incident on the second optical element at a predetermined incidence angle to a side of the second optical element on which the first diffracted light is incident, and the incidence angle of the incident light which is incident on the first optical element may be different from each of an incidence angle of the first diffracted light which is incident on the second optical element and a diffraction angle of the second diffracted light which is deflected by the deflection function of the second optical element and is emitted from the second optical element.

In the image display device of the first aspect according to the present technology, at least one of a direction of the incidence angle of the incident light which is incident on the first optical element or a direction of the diffraction angle of the first diffracted light which is emitted from the first optical element may be a direction of a forehead, a nose, or a glabella of a user.

In the image display device of the first aspect according to the present technology, each of the first optical element and the second optical element may be any one optical element of a volume-type hologram optical element, a diffraction grating optical element, and a meta-surface optical element.

Further, as a second aspect according to the present technology, there is provided an image display device including: at least one optical element unit including at least three optical elements facing each other, in which one optical element unit included in the at least one optical element unit includes a first optical element, a second optical element, and a third optical element, an image is formed on the basis of image display light which transmits through the first optical element and is emitted to outside of the image display device, the first optical element has a deflection function of deflecting incident light which has a predetermined wavelength and is incident on the first optical element at a predetermined incidence angle to a side of the first optical element on which the incident light is incident, and emits first diffracted light deflected by the deflection function, the third optical element has a deflection function of deflecting the first diffracted light which has a predetermined wavelength and is incident on the third optical element at a predetermined incidence angle to a side of the third optical element on which the first diffracted light is incident, and emits third diffracted light deflected by the deflection function, the second optical element has a lens function for the third diffracted light which has a predetermined wavelength and is incident on the second optical element at a predetermined incidence angle, and a direction of the incidence angle of the incident light and a direction of a diffraction angle of the first diffracted light are different from a direction of a diffraction angle of the third diffracted light.

In the image display device of the second aspect according to the present technology, the second optical element may have a deflection function of deflecting the third diffracted light which has a predetermined wavelength, transmits through the first optical element, and is incident on the second optical element at a predetermined incidence angle to a side opposite to a side of the second optical element on which the third diffracted light is incident, and may emit fourth diffracted light deflected by the deflection function as the image display light.

In the image display device of the second aspect according to the present technology, each of the first optical element, the second optical element, and the third optical element may be any one optical element of a volume-type hologram optical element, a diffraction grating optical element, and a meta-surface optical element.

Furthermore, as a third aspect according to the present technology, there is provided a display device including: a frame mounted on a head of a user;
an image projection device attached to the frame; and the image display device of the first aspect according to the present technology or the image display device of the second aspect according to the present technology, the image display device being attached to an eyeball surface, in which the display device displays an image on a retina by projecting a display image projected from the image projection device onto the image display device.

According to the present technology, it is possible to improve display at the fovea of the eye, which is the most important part in a display range, such that display at the fovea of the eye is not darkened. Note that the effects described herein are not necessarily limited and any of the effects described in the present disclosure may be exhibited.

BRIEF DESCRIPTION OF DRAWINGS

FIGS. 1A and 1B are diagrams for explaining that display light beams are projected on an image display device and the display light beams reach a retina by the image display device.

FIG. 2 is a diagram for explaining a path through which the display light which is incident on the image display device is emitted from the image display device.

FIG. 3 is a diagram illustrating coordinates of diffraction efficiency of the display light which reaches a retina.

FIG. 4 is a diagram for explaining a path through which the display light which is incident on the image display device is emitted from the image display device.

FIG. 5 is a diagram illustrating a relationship between the number of times of diffraction (the number of times of incidence of light which is incident on a deflection HOE and the number of times of incidence of light which is incident on a lens HOE), a light amount of diffracted light, and a light amount of transmitted light (zero-order light) in a case where a diffraction direction of the diffracted light is set to 0 degrees and the diffraction efficiency is further set to 95%.

FIG. 8 is a diagram for explaining a relationship between incident light and diffracted light in eyeball rotation $\pm\Theta$.

FIGS. 9A and 9B are diagrams illustrating a configuration example of an image display device of a first embodiment to which the present technology is applied.

FIG. 10 is a diagram illustrating a configuration example of an image display device of a second embodiment to which the present technology is applied.

FIGS. 11A and 11B are diagrams illustrating a configuration example of an image display device of a third embodiment to which the present technology is applied.

FIGS. 12A and 12B are diagrams illustrating a configuration example of an image display device of a fourth embodiment to which the present technology is applied.

FIG. 13 is a diagram illustrating a configuration example of an image display device of a fifth embodiment to which the present technology is applied.

FIG. 14 is a diagram illustrating a configuration example of an image display device of a sixth embodiment to which the present technology is applied.

FIG. 19 is a diagram illustrating a configuration example of an image display device of an eleventh embodiment to which the present technology is applied.

FIG. 20 is a diagram illustrating a configuration example of an image display device of a twelfth embodiment to which the present technology is applied.

FIGS. 21A and 21B are diagrams illustrating a configuration example of an image display device of a thirteenth embodiment to which the present technology is applied.

FIGS. 22A, 22B, and 22C are diagrams illustrating coordinates of diffraction efficiency of display light which reaches a retina.

FIG. 23 is a diagram illustrating a visual field range of a right eye.

MODE FOR CARRYING OUT THE INVENTION

Figures 6, 7:
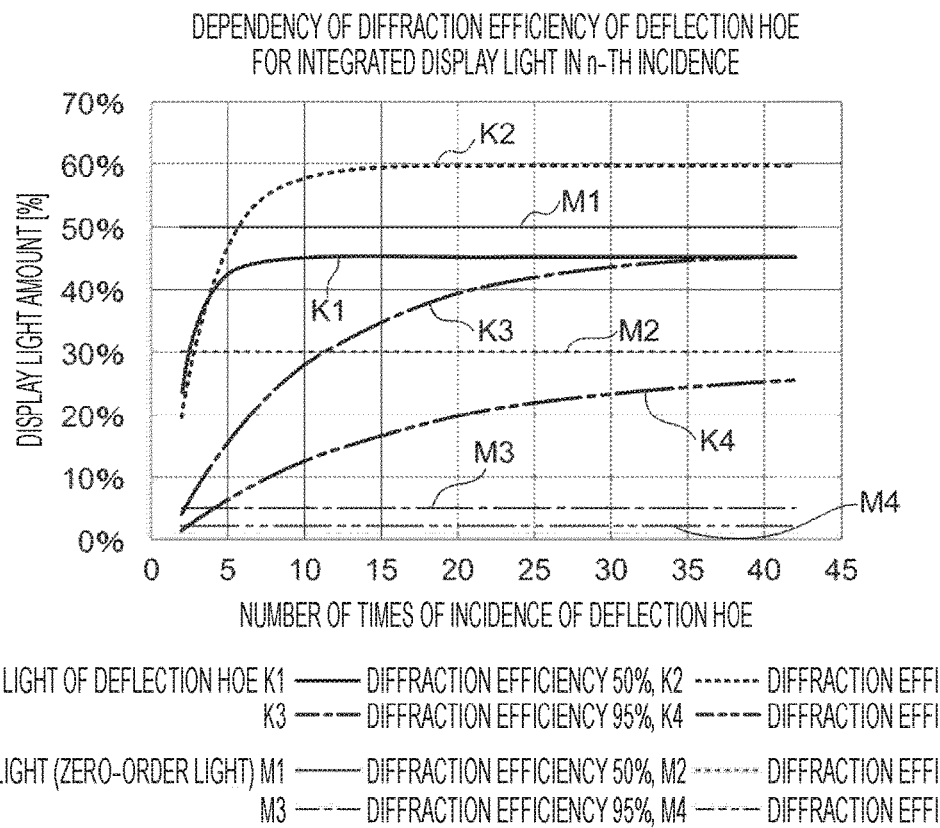
FIG. 6 is a diagram illustrating dependency of the diffraction efficiency of the deflection HOE for integrated display light in n-th incidence.
FIG. 7 is a diagram illustrating basic characteristics of the optical elements of the HOEs used in the present technology.

Hereinafter, preferred embodiments for carrying out the present technology will be described. The embodiments to be described below show an example of representative embodiments of the present technology, and the scope of the present technology is not narrowed by the embodiments. Note that unless otherwise specified, in the drawings, "upward" means an upward direction or an upper side in the drawings, "downward" means a downward direction or a lower side in the drawings, "left" means a left direction or a left side in the drawings, and "right" means a right direction or a right side in the drawings. Further, in the description with reference to the drawings, the same or equivalent elements or members are denoted by the same reference numerals, and redundant description will be omitted.

Note that the description will be given in the following order.
1. Outline of Present Technology
2. First Embodiment (Example 1 of Image Display Device)
3. Second Embodiment (Example 2 of Image Display Device)
4. Third Embodiment (Example 3 of Image Display Device)
5. Fourth Embodiment (Example 4 of Image Display Device)
6. Fifth Embodiment (Example 5 of Image Display Device)
7. Sixth Embodiment (Example 6 of Image Display Device)
8. Seventh Embodiment (Example 7 of Image Display Device)
9. Eighth Embodiment (Example 8 of Image Display Device)
10. Ninth Embodiment (Example 9 of Image Display Device)
11. Tenth Embodiment (Example 10 of Image Display Device)
12. Eleventh Embodiment (Example 11 of Image Display Device)
13. Twelfth Embodiment (Example 12 of Image Display Device)
14. Thirteenth Embodiment (Example 13 of Image Display Device)

15. Fourteenth Embodiment (Example 1 of Display Device)

1. Outline of Present Technology

First, an outline of the present technology will be described. The present technology relates to an image display device and a display device.

For example, in an augmented reality (AR) display device, in a case where a first diffraction element and a second diffraction element facing each other are configured, light reflected and diffracted by the first diffraction element is incident on the second diffraction element. Light reflected and diffracted by the second diffraction element is incident on the first diffraction element again. The incident light passes through the first diffraction element, and is incident on an eyeball.

However, in a case where the light diffracted by the second diffraction element has an angle close to a diffraction angle of the first diffraction element, the light which is incident on the first diffraction element is diffracted again. For this reason, the light which is incident on the eyeball is reduced. As a result, a center of a display visual field may be dimmed or missed. This will be described in detail below.

For example, there are an image projection device and a display device that projects display light from the image projection device onto a contact-lens-type image display device and forms an image of the display light on a retina by the contact-lens-type image display device. The contact-lens-type image display device includes a reflective-volume-type hologram including a deflection holographic optical element (hereinafter, referred to as HOE) and a lens holographic optical element (hereinafter, referred to as HOE). The HOE has a structure in which a diffraction angle of incident light is set as a certain angle, and thus the HOE has an effect on a designed wavelength only at a specific angle.

A description will be given with reference to FIGS. 1A and 1B. FIGS. 1A and 1B are diagrams for explaining that five display light beams (L-A to L-E) are projected on an image display device 1-100 and the display light beams reach a retina M1 by the image display device 1-100. FIG. 1B is an enlarged diagram of a part of FIG. 1A indicated by a reference numeral A-1. The five display light beams (L-A to L-E) are condensed at one point near a pupil M3 (focal point S-100). Note that a reference numeral M2 denotes an iris. Then, as illustrated in FIG. 1B, the image display device 1-100 includes a deflection HOE 10-100 and a lens HOE 20-100.

As indicated by reference numerals F1 to F5 in FIG. 1B, in a case where an incidence angle and a diffraction angle of the deflection HOE 10-100 are set to 0°, both an incidence angle of the lens HOE 20-100 and an optical axis of a condensing lens are set to 0°.

A description will be given with reference to FIG. 2. FIG. 2 is a diagram for explaining a path through which the display light which is incident on the image display device is emitted from the image display device. The image display device illustrated in FIG. 2 includes a protective layer 700, a lens HOE 20, a deflection HOE 10, and a protective layer 600 in order from an incidence side of incident light L0 (in order from an upper side of FIG. 2).

In FIG. 2, only an optical axis component of the diffracted light of the lens HOE 20 will be described. On the other hand, the incident light L0 transmits through the lens HOE 20. As a result, there are a component (light L1) which is incident on the deflection HOE 10 and is diffracted and a component (light L11) which transmits through the deflection HOE 10. In this case, light which cannot be diffracted transmits through the deflection HOE 10 unless a diffraction efficiency is 100%.

Here, as illustrated in FIG. 2, the incident light L0 is diffracted by the deflection HOE 10 (light L1), and is diffracted by the lens HOE 20 (light L2). The light L2 which is re-incident on the deflection HOE 10 transmits through the deflection HOE 10, and only transmitted light L31 becomes the image display light.

However, in FIGS. 1A and 1B, an optical axis of light, which is incident on the lens HOE 20-100 and is condensed, reflected, and diffracted by a lens, and an incidence angle of the deflection HOE 10-100 on which the light is re-incident match with each other. Thus, a light beam component near the optical axis is diffracted by the deflection HOE (for example, light L3 in FIG. 2). The condensed light beam component which is away from the optical axis and has an angle deviates from an angle at which the deflection HOE has an effect. Thus, the condensed light beam component transmits through the deflection HOE (for example, light L31 in FIG. 2).

A description will be given with reference to FIG. 3. FIG. 3 is a diagram illustrating coordinates of diffraction efficiency of display light which reaches a retina via a contact-lens-type image display device as one technical example. In FIG. 3, a reference numeral P2 denotes a range in which diffraction efficiency is high, and a reference numeral P1 denotes a range in which diffraction is not performed. Here, the optical axis of the lens HOE corresponds to a fovea on the retina.

In practice, 100% diffraction efficiency cannot be achieved, and thus a part of light in the vicinity of the optical axis of the lens HOE is transmitted. Then, among the display light beams, the number of light beams which are in the vicinity of the optical axis and reach the retina is small. Thus, display at a center portion of the display range becomes dark.

Since display at the fovea that is a most important in the display range becomes dark, the present technology avoids this problem.

Next, a description will be given with reference to FIG. 4. FIG. 4 is a diagram for explaining a path through which the display light which is incident on the image display device is emitted from the image display device.

The light which reaches the retina as the display light (image display light) is only a component transmitted through the deflection HOE 10 among light beams which are re-incident on the deflection HOE 10 (light L31). In a path until the image display light reaches the retina, (1) projection of the incident light L0→(2) diffraction (light L1) by the deflection HOE 10→(3) diffraction (light L2) by the lens HOE 20→(4) transmission through the deflection HOE (light L31)→(5) reaching the retina are performed in this order.

FIG. 5 is a diagram illustrating a relationship between the number of times of diffraction (the number of times of incidence of light which is incident on the deflection HOE 10 and the number of times of incidence of light which is incident on the lens HOE 20) and a light amount of the diffracted light and a light amount of the transmitted light (zero-order light) in a case where a diffraction direction of the diffracted light is set to 0 degrees and diffraction efficiency is further set to 95%. In FIG. 5, stray light (zero-order light) of 5% of light which is first-incident on the deflection HOE indicates the light L01 in FIG. 4, and leaked light of 4.75% of light which is first-incident on the lens HOE indicates the light L21 in FIG. 4.

Referring to FIG. 5, the following is considered.

In the re-incidence of the light on the deflection HOE 10, in a case where the diffraction angles of the deflection HOE 10 and the lens HOE 20 are the same, there is a possibility that the display light L31 is dim. (Note that there is a case where it is not impossible to display the display light L31 but the display light L31 is dark).

In multiple re-incidence, the display light 31 is finally about 45% (in FIG. 5, contact lens (CL) display light=46.3%) of the incident light (projection light) L0. In consideration of light absorption, there is a possibility that the display light 31 is further reduced from about 45%.

Due to multiple diffraction, there is a possibility that a focal position of the lens HOE 20 is shifted by a thickness of the hologram optical element per diffraction and blurring occurs.

Optimization of diffraction efficiency will be discussed. Assuming that the diffraction efficiency of the deflection HOE is defined as diffraction efficiency $\eta_D$ and the diffraction efficiency of the lens HOE is defined as diffraction efficiency $\eta_L$, integrated display light (Expression 1) is as follows.

Display light of second incidence of deflection HOE:
$1-\eta_D^2 \times \eta_L$

Display light of third incidence of deflection HOE:
$1-\eta_D^3 \times \eta_L^2$ Display light of $n$-th incidence of deflection HOE:
$1-\eta_D^n \times \eta_L^{n-1}$ Integrated display light of $n$-th incidence: $(1-\eta_D^n \times \eta_L^{n-1})$  Expression 1

As described above, the display light amount increases as the diffraction efficiency of the lens HOE increases. Thus, it is preferable to fix the diffraction efficiency of the lens HOE to maximum diffraction efficiency. In addition, in a case where the diffraction efficiency of the deflection HOE is too high, an amount of light which is re-incident on the deflection HOE and transmits through the deflection HOE may decrease.

A description will be given with reference to FIG. 6. FIG. 6 is a diagram illustrating dependency of the diffraction efficiency of the deflection HOE for the integrated display light in n-th incidence. In FIG. 6, a horizontal axis represents the number of times of incidence on the deflection HOE, and a vertical axis represents the display light amount (%).

K1 in FIG. 6 is a display light amount (%) with respect to the number of times of incidence of diffracted light emitted from the deflection HOE on the deflection HOE in a case where the diffraction efficiency is 50%, K2 in FIG. 6 is a display light amount (%) with respect to the number of times of incidence of diffracted light emitted from the deflection HOE on the deflection HOE in a case where the diffraction efficiency is 70%, K3 in FIG. 6 is a display light amount (%) with respect to the number of times of incidence of reflected and diffracted light emitted from the deflection HOE on the deflection HOE in a case where the diffraction efficiency is 95%, and K4 in FIG. 6 is a display light amount (%) with respect to the number of times of incidence of diffracted light emitted from the deflection HOE on the deflection HOE in a case where the diffraction efficiency is 98%.

On the other hand, M1 in FIG. 6 is a display light amount (%) with respect to the number of times of incidence of stray light (zero-order light) transmitting through the deflection HOE on the deflection HOE in a case where the diffraction efficiency is 50%, M2 in FIG. 6 is a display light amount (%) with respect to the number of times of incidence of stray light (zero-order light) transmitting through the deflection HOE on the deflection HOE in a case where the diffraction efficiency is 70%, M3 in FIG. 6 is a display light amount (%) with respect to the number of times of incidence of stray light (zero-order light) transmitting through the deflection HOE on the deflection HOE in a case where the diffraction efficiency is 95%, and M4 in FIG. 6 is a display light amount (%) with respect to the number of times of incidence of stray light (zero-order light) transmitting through the deflection HOE on the deflection HOE in a case where the diffraction efficiency is 98%.

Referring to FIG. 6, the following is considered.

In a case where multiple-incident light beams become a ghost, it is considered that the ghost is mitigated by a reduction in diffraction efficiency of light which is re-incident on the deflection HOE.

As illustrated in FIG. 6, in a case where the diffraction efficiency of the deflection HOE is 70%, the display light amount is higher than the display light amounts in a case where the diffraction efficiency of the deflection HOE is 50% and 95%. On the other hand, in first incidence on the deflection HOE, 30% of the display light amount of the zero-order light which is not diffracted is incident on the retina as stray light. From an examination result of the zero-order light, there is a case where a visual field is influenced, and there is a case where an influence of the stray light needs to be considered.

FIG. 7 is a diagram illustrating basic characteristics of the optical elements of the HOEs used in the present technology, and specifically, is a diagram illustrating reflection and diffraction characteristics of two types of deflection HOEs (a deflection HOE in which incident light is diffracted in a substantially regular reflection direction and a deflection HOE in which incident light is diffracted in a substantially inverse regular reflection direction). As illustrated in FIG. 7, the reflection and diffraction characteristics are greatly different between the deflection HOE in which the incident light is diffracted in the substantially regular reflection direction and the deflection HOE in which the incident light is diffracted in the substantially reverse regular reflection direction.

Specifically, the deflection HOE in which the incident light is diffracted in the substantially regular reflection direction has substantially the same diffraction direction as a diffraction direction of a mirror, and the deflection HOE in which the incident light is diffracted in the substantially reverse regular reflection direction has substantially the same diffraction direction as a diffraction direction of reference light (incident light). The deflection HOE in which the incident light is diffracted in the substantially regular reflection direction has large angle dependence, and the deflection HOE in which the incident light is diffracted in the substantially inverse regular reflection direction has small and broad angle dependence. The deflection HOE in which the incident light is diffracted in the substantially regular reflection direction has large wavelength dependence, and the deflection HOE in which the incident light is diffracted in the substantially reverse regular reflection direction has very large wavelength dependence. The deflection HOE in which the incident light is diffracted in the substantially regular reflection direction has high diffraction efficiency, and the deflection HOE in which the incident light is diffracted in the substantially reverse regular reflection direction has very high diffraction efficiency.

FIG. 8 is a diagram for explaining a relationship between incident light and diffracted light in eyeball rotation ±Θ. Specifically, FIG. 8A-1 to FIG. 8A-4 are diagrams for explaining a relationship between incident light beams L0-300-1 to L0-300-4 and a reflected and diffracted light beam L1-300 in eyeball rotation ±Θ with respect to the deflection HOE 300 in which the incident light is diffracted in the substantially regular reflection direction. FIG. 8B-1 to FIG. 8B-4 are diagrams for explaining a relationship between incident light beams and a diffracted light beam in eyeball rotation ±Θ with respect to the deflection HOE 400 in which the incident light is diffracted in the substantially reverse regular reflection direction.

First, a description will be given with reference to FIG. 8A-1 to FIG. 8A-4. As illustrated in FIG. 8A-1, the incident light L0-300-1 is incident on the deflection HOE 300, and the reflected and diffracted light L1-300 is emitted from the deflection HOE 300 by the deflection HOE 300 having a deflection function of deflecting the incident light L0-300-1 in the substantially regular reflection direction on a side on which the incident light L0-300-1 is incident. In the deflection HOE 300 in FIG. 8A-1, a plurality of gratings (interference stripes) 80 extending in a horizontal direction (a lateral direction in FIG. 8A-1) is formed.

As illustrated in FIG. 8A-2, an incidence angle of the incident light L0-300-2 is Θm0, as illustrated in FIG. 8A-3, an incidence angle of the incident light L0-300-3 is Θm1 (=Θm0−Θ), and as illustrated in FIG. 8A-4, an incidence angle of the incident light L0-300-4 is Θm2 (=Θm0+θ). Therefore, a relationship of Θm1<Θm2 is established, and in a case where the eyeball rotation (±Θ) is taken into consideration, an "absolute value" of the incidence angle in incidence angle difference with respect to the grating 80 differs in the rotation direction of the eyeball.

Next, a description will be given with reference to FIG. 8B-1 to FIG. 8B-4. As illustrated in FIG. 8B-1, the incident light L0-400-1 is incident on the deflection HOE 400, and the reflected and diffracted light L1-400 is emitted from the deflection HOE 400 by the deflection HOE 400 having a deflection function of deflecting the incident light L0-400-1 in the substantially reverse regular reflection direction on a side on which the incident light L0-400-1 is incident. In the deflection HOE 300 in FIG. 8A-1, three gratings (interference stripes) 90 extending in a diagonal right direction (a direction from a lower left portion to an upper right portion in FIG. 8A-1) are formed.

As illustrated in FIG. 8B-2, an incidence angle of the incident light L0-400-2 is Θr0, as illustrated in FIG. 8B-3, an incidence angle of the incident light L0-400-3 is Θr1 (=Θr0−Θ), and as illustrated in FIG. 8B-4, an incidence angle of the incident light L0-400-4 is Θr2 (=Θr0+Θ). Therefore, a relationship of Θr1=Θr2 is established, and in a case where the eyeball rotation (±Θ) is taken into consideration, there is no "absolute value" of the incidence angle difference with respect to the grating. Thus, it is considered that the deflection HOE 400 is robust.

From the above, in consideration of the eyeball rotation, it is considered that the HOE (in FIG. 8, the deflection HOE 400) having small angle dependence, high diffraction efficiency, and a substantially reverse regular reflection type is more robust and better. However, a display range in a case where the display light amount at the center of the visual field is prevented from being low as will be described below is different. Thus, it is necessary to perform determination in consideration of tolerance and the like together with a projection optical system.

The present technology can be used for, for example, a contact-lens-type image display device (display device). The contact-lens-type image display device is attached to a front surface of the eyeball. The contact-lens-type image display device according to the present technology can be used in combination with a projection optical system that allows a video to be incident. Note that the present technology can also use a substrate (for example, a light guide plate) as in an image display device according to a fifth embodiment of the present technology to be described later, and a configuration realized by the image display device according to the present technology is not be limited.

In the present technology, light (light beam) which is incident on a first optical element (for example, a deflection HOE) is projected using an image projection device. The incident light transmits through, for example, a second optical element (for example, a lens HOE) as in the image display device of a sixth embodiment or the image display device of a seventh embodiment according to the present technology to be described later, and is incident on the first optical element at an angle different from the optical axis of the second optical element having a lens function. The light beam which is incident by a (diffraction grating) structure provided in the first optical element is reflected and diffracted in a certain direction different from the optical axis of the second optical element having a lens function, and the diffracted light is incident on the second optical element.

The incident light is reflected and diffracted by a (diffraction grating) structure provided in the second optical element in a condensing (or diverging) direction with the lens optical axis and in substantially perpendicular to a contact lens surface of the second optical element having a lens function.

The optical axis component of the light reflected and diffracted by the second optical element is re-incident on the first optical element. On the other hand, a reflection and diffraction effect of the structure of the first optical element does not occur, and thus the optical axis component of the light reflected and diffracted by the second optical element is transmitted without being diffracted. The transmitted light passes through the eyeball and is incident on the retina.

In the light which is incident on the eyeball, light on the lens optical axis of the second optical element reaches the fovea of the eyeball. Therefore, a light amount of an image at a center portion of a display image does not decrease, and thus it is possible to perform display for the fovea.

In the above, it has been described that the light transmits through the first optical element included in the contact-lens-type image display device and reaches the retina. Next, a diffraction distribution in an in-plane direction of an image display device (for example, a contact-lens-type image display device) will be described with reference to FIGS. 22A, 22B, and 22C.

FIGS. 22A, 22B, and 22C illustrate a distribution of diffraction efficiency at a light beam incidence position when the optical element is viewed from the front surface in a case where the optical element included in the image display device is used as a contact-lens-type optical element. FIG. 3 (FIG. 22A) described above illustrates a case where the incidence angle and the diffraction angle with respect to the first optical element and the second optical element are 0 degrees. When the contact-lens-type optical element is viewed from the front surface, light passing through the center of the contact lens (optical element) passes through the lens optical axis of the second optical element. Thus, the light reaches the fovea of the retina after being diffracted by the first optical element and the second optical element.

As illustrated in FIG. 22A (FIG. 3), in the display visual field as one technical example, there is a portion having no diffraction efficiency at the center portion of the optical element (P1 region).

Although this will be described in detail later, FIG. 22B illustrates a diffraction efficiency distribution in a case where light is incident on the first optical element 10 included in the image display device 1 (the image display device 1-1 and the image display device 1-2) (FIGS. 9A and 9B) of a first embodiment according to the present technology at 45°, is diffracted at 45° in a substantially regular reflection direction, and is condensed and diffracted by the second optical element 20 as a lens in a direction substantially perpendicular to the second optical element 20 to project a video on the retina. As illustrated in FIG. 22B, in the substantially center portion of the contact-lens-type image display device, a portion in which light is diffracted and which has low diffraction efficiency is located in a donut shape at a position slightly shifted from the substantially center portion (region P10). This means that light reaches the fovea of the retina and thus a portion in which the diffraction efficiency decreases is located at a peripheral part of the visual field.

For this reason, according to the configuration of the present technology (for example, the image display device of the first embodiment according to the present technology), a position in the display visual field range that is displayed with respect to the fovea and at which the diffraction efficiency decreases can be excluded from a peripheral visual field.

Next, although this will be described in detail later, FIG. 22C illustrates a diffraction efficiency distribution in a case where light is incident on the first optical element 10 included in the image display device 2 (FIG. 10) of a second embodiment according to the present technology at 45°, is diffracted at 45° in a substantially reverse regular reflection direction, and is condensed and diffracted by the second optical element 20 as a lens in a direction substantially perpendicular to the second optical element 20 to project a video on the retina. As illustrated in FIG. 22C, in the substantially center portion of the contact-lens-type image display device, a portion in which light is diffracted and which has low diffraction efficiency is located in a round shape at a position slightly shifted from the substantially center portion (P100 region). This means that light reaches the fovea of the retina and thus a portion in which the diffraction efficiency decreases is located at a peripheral part of the visual field.

For this reason, for example, similarly to the image display device of the first embodiment according to the present technology, according to the configuration of the present technology (for example, the image display device of the second embodiment according to the present technology), a position in the display visual field range that is displayed with respect to the fovea and at which the diffraction efficiency decreases can be excluded from a peripheral visual field.

Here, in the image display devices of the first and second embodiments according to the present technology, the position at which the diffraction efficiency decreases as the incidence angle on the contact-lens-type image display device increases is moved to the peripheral visual field.

Meanwhile, as described above, in the image display device of the second embodiment according to the present technology, there is a region in which the diffraction efficiency decreases near the fovea as compared with the image display device of the first embodiment according to the present technology. FIG. 23 illustrates a visual field range of a right eye. A region 23V illustrated in FIG. 23 indicates a range in which a right eye can be seen, and an outer side of a boundary line K23 of the region 23V indicates a range in which the right eye cannot be seen. Numerical values (0° to 360°) around a circle illustrated in FIG. 23 indicate azimuths (azimuth angles) from the right eye, and numerical values (0° to 100°) extending outward from a center portion of the circle indicate visual field ranges. A reference numeral S1 illustrated in FIG. 23 is a region of a forehead (eyebrow), a reference numeral S2 is a region of a glabella, and a reference numeral S3 is a region of a nose.

As illustrated in FIG. 23, the visual field of the right eye is not uniform in all azimuths, and the visual field is blocked in the forehead direction >45°, the nose direction >45°, and the glabella direction >60°.

Therefore, by providing a region in which the diffraction efficiency decreases according to the second example in the forehead direction, the nose direction, and the glabella direction, it is possible to reduce an influence of a region in which the visual field is narrowed and to obtain the visual field having a widest range for other azimuths.

The above description is an outline of the present technology. Then, at least the following are examples of effects of the present technology.

In the above-described technical example, the diffracted light beam direction of the light beam of the first optical element (for example, the deflection HOE) is the same as the direction of the optical axis of the second optical element (for example, the lens HOE) that generates the light beam in the display visual field. As a result, in a case where diffraction occurs when the light beam is re-incident on the first optical element (for example, the deflection HOE), the center of the display visual field is missed. For this reason, the incident light and the diffraction angle of the first optical element (for example, the deflection HOE) are deviated (set to be different) from the optical axis of the second optical element (for example, the lens HOE). Therefore, the re-incidence position at which the display is missed can be moved from the center to the peripheral part of the display visual field.

As a result, display can be performed at the center of the visual field, and a display visual field that is not influenced by a use state can be obtained.

Further, for example, in a case where the HOE which has a substantially reverse regular reflection type and is included in the image display device of the second embodiment according to the present technology is used, the HOE has a feature that the angle dependence is small and the diffraction efficiency is high in consideration of the rotation of the eyeball. Therefore, a robust effect can be obtained.

Meanwhile, in the HOE having a substantially reverse regular reflection type, a range in which diffraction occurs when the light is re-incident is located with a specific size (including an ellipse) at a concentrated portion around the incidence (diffraction) direction of the light on the deflection HOE which is the first optical element. On the other hand, for example, in a case where the HOE which has a substantially regular reflection type and is included in the image display device of the first embodiment according to the present technology is used, the HOE has a feature that a range in which diffraction occurs when the light is re-incident has a doughnut shape (including an ellipse at oblique incidence) and a missed range in an angle direction is narrow. Therefore, the missed range can be narrowed, and thus an effect of securing a wide display range can be obtained.

Hereinafter, preferred embodiments for carrying out the present technology will be specifically described in detail with reference to the drawings. The embodiments to be described below show an example of representative embodiments of the present technology, and the scope of the present technology is not narrowed by the embodiments.

2. First Embodiment (Example 1 of Image Display Device)

The image display device of the first embodiment (Example 1 of the image display device) according to the present technology will be described with reference to FIGS. 9A and 9B.

FIGS. 9A and 9B are diagrams illustrating a configuration example of the image display device of the first embodiment according to the present technology. Specifically, FIG. 9A is a diagram illustrating the image display device 1-1, and FIG. 9B is a diagram illustrating the image display device 1-2.

(Image Display Device 1-1)

The image display device 1-1 includes at least an optical element unit including a first optical element 10 and a second optical element 20 facing each other. In the image display device 1-1, an image is formed on the basis of image display light (display light) L3-1A transmitted through the first optical element 10 and emitted to the outside of the image display device 1-1. In the image display device 1-1, the first optical element 10 and the second optical element 20 may be disposed close to each other.

The image display device 1-1 may include at least another optical element unit in addition to the optical element unit including the first optical element 10 and the second optical element 20. For example, the image display device 1-1 may include a total of three optical element units including an optical element unit for a blue wavelength band, an optical element unit for a green wavelength band, and an optical element unit for a red wavelength band. This configuration can be applied to the image display device 1-2, the image display device 2, the image display device 3 (3-1, 3-2), the image display device 4 (4-1, 4-2), the image display device 5, the image display device 6, the image display device 7, the image display device 8, the image display device 9, the image display device 10, the image display device 11, the image display device 12, and the image display device 13 (13-1, 13-2) to be described below.

Each of the first optical element 10 and the second optical element 20 may be any one optical element of a volume-type hologram optical element, a diffraction grating optical element, or a meta-surface optical element.

The first optical element 10 has a deflection function of deflecting incident light L0-1A, which has a predetermined wavelength and is incident on the first optical element 10 at a predetermined incidence angle deviated from an optical axis of a lens of the second optical element 20, to a side of the first optical element 10 on which the incident light L0-1A is incident, and emits first diffracted light L1-1A deflected by the deflection function.

As illustrated in FIG. 9A, in a three-dimensional coordinate system of the image display device 1-1, a normal line of the first optical element 10 is in a +z axis direction (an upward direction in FIG. 9A) from the origin of the three-dimensional coordinate system, and an upper surface (an upper surface in FIG. 9A) of the first optical element 10 is an x-y plane (a plane extending from a front side to a back side of the paper surface). The incident light L0-1A which is incident on the first optical element 10 is light which is in the +z axis direction (the upward direction in FIG. 9A) and extends from a certain point within a second quadrant range, within a third quadrant range, or on an −x axis (an axis in a left direction of FIG. 9A) of an x-y coordinate system (a coordinate system extending from the front side to the back side of the paper surface) toward the origin of the three-dimensional coordinate system. The first diffracted light L1-1A emitted from the first optical element 10 is light which is in the +z axis direction (the upward direction in FIG. 9A) and extends from the origin of the three-dimensional coordinate system toward a certain point within a first quadrant range, within a fourth quadrant range, on an +x axis (an axis in a right direction of FIG. 9A), on a +y axis (an axis extending from the front side of the paper surface to the back side of the paper surface in FIG. 9A), or on a −y axis (an axis extending from the back side of the paper surface to the front side of the paper surface in FIG. 9A) of the x-y coordinate system (a coordinate system extending from the front side to the back side of the paper surface). That is, the first diffracted light L1-1A is deflected in a substantially regular reflection direction with respect to the incident light L0-1A.

The second optical element 20 has a lens function for the first diffracted light L1-1A which has a predetermined wavelength and is incident on the second optical element 20 at a predetermined incidence angle. The lens function means a function of condensing (convex lens) or diverging (concave lens) light (light beams) (The same applies to the lens function).

Then, the second optical element 20 has a deflection function of deflecting the first diffracted light L1-1A, which has a predetermined wavelength and is incident on the second optical element 20 at a predetermined incidence angle, to a side of the second optical element 20 on which the first diffracted light L1-1A is incident, and emits second diffracted light L2-1A deflected by the deflection function. The second diffracted light L2-1A is condensed by the above-described lens function and is re-incident on the first optical element 10. At this time, the first optical element 10 does not have an effect of deflecting the light in the optical axis direction of the lens. Thus, the second diffracted light L2-1A transmits through the first optical element 10, and reaches the retina as the image display light L3-1A. Therefore, the center of the display visual field corresponding to the lens optical axis is not missed.

Then, in the image display device 1-1, a direction of the incidence angle of the incident light L0-1A and a direction of the diffraction angle of the first diffracted light L1-1A are different from a direction of the optical axis of the second optical element 20.

(Image Display Device 1-2)

The image display device 1-2 includes at least an optical element unit including a first optical element 10 and a second optical element 20 facing each other. In the image display device 1-2, an image is formed on the basis of image display light (display light) L3-1B transmitted through the first optical element 10 and emitted to the outside of the image display device 1-2. As illustrated in FIG. 9B, in the image display device 1-2, the first optical element 10 and the second optical element 20 are disposed in contact with each other.

The first optical element 10 has a deflection function of deflecting incident light L0-1B, which has a predetermined wavelength and is incident on the first optical element 10 at a predetermined incidence angle deviated from an optical axis of the second optical element 20 having a lens function, to a side of the first optical element 10 on which the incident light L0-1B is incident, and emits first diffracted light L1-1B deflected by the deflection function.

As illustrated in FIG. 9B, in a three-dimensional coordinate system of the image display device 1-2, a normal line of the first optical element 10 is in a +z axis direction (an upward direction in FIG. 9B) from the origin of the three-dimensional coordinate system, and an upper surface (an upper surface in FIG. 9B) of the first optical element 10 is an x-y plane (a plane extending from a front side to a back side of the paper surface). The incident light L0-1B which is incident on the first optical element 10 is light which is in the +z axis direction (the upward direction in FIG. 9B) and extends from a certain point within a second quadrant range, within a third quadrant range, or on an −x axis (an axis in a left direction of FIG. 9B) of an x-y coordinate system (a coordinate system extending from the front side to the back side of the paper surface) toward the origin of the three-dimensional coordinate system. The first diffracted light L1-1B emitted from the first optical element 10 is light which is in the +z axis direction and extends from the origin of the three-dimensional coordinate system toward a certain point within a first quadrant range, within a fourth quadrant range, on an +x axis (an axis in a right direction of FIG. 9B), on a +y axis (an axis extending from the front side of the paper surface to the back side of the paper surface in FIG. 9B), or on a −y axis (an axis extending from the back side of the paper surface to the front side of the paper surface in FIG. 9B) of the x-y coordinate system (a coordinate system extending from the front side to the back side of the paper surface). That is, the first diffracted light L1-1B is deflected in a substantially regular reflection direction with respect to the incident light L0-1B.

The second optical element 20 has a lens function for the first diffracted light L1-1B which has a predetermined wavelength and is incident on the second optical element 20 at a predetermined incidence angle.

Then, the second optical element 20 has a deflection function of deflecting the first diffracted light L1-1B, which has a predetermined wavelength and is incident on the second optical element 20 at a predetermined incidence angle, to a side of the second optical element 20 on which the first diffracted light L1-1B is incident, and emits second diffracted light L2-1B deflected by the deflection function.

In the image display device 1-2, a direction of the incidence angle of the incident light L0-1B and a direction of the diffraction angle of the first diffracted light L1-1B are different from a direction of the optical axis of the second optical element 20.

As described above, the content described for the image display device of the first embodiment (Example 1 of the image display device) according to the present technology can be applied to the image display devices of the second to thirteenth embodiments according to the present technology to be described later as long as there is no particular technical inconsistency.

3. Second Embodiment (Example 2 of Image Display Device)

The image display device of the second embodiment (Example 2 of the image display device) according to the present technology will be described with reference to FIG. 10. In the image display device of the second embodiment according to the present technology, in a case where light is incident on the first optical element at an angle deviated from the optical axis of the lens of the second optical element, the first optical element has an effect of reflecting and diffracting the incident light by deflecting the incident light in the substantially reverse regular reflection direction with respect to the incidence direction. Examples of the first optical element and the second optical element include a volume-type HOE.

FIG. 10 is a diagram illustrating a configuration example of the image display device of the second embodiment according to the present technology. Specifically, FIG. 10 is a diagram illustrating the image display device 2.

(Image Display Device 2)

The image display device 2 includes at least an optical element unit including a first optical element 10 and a second optical element 20 facing each other. In the image display device 2, an image is formed on the basis of image display light (display light) L3-2 transmitted through the first optical element 10 and emitted to the outside of the image display device 2. In the image display device 2, the first optical element 10 and the second optical element 20 may be disposed close to each other. Although not illustrated in FIG. 10, the first optical element 10 and the second optical element 20 may be disposed in contact with each other.

The first optical element 10 has a deflection function of deflecting incident light L0-2, which has a predetermined wavelength and is incident on the first optical element 10 at a predetermined incidence angle deviated from an optical axis of a lens of the second optical element 20, to a side of the first optical element 10 on which the incident light L0-2 is incident, and emits first diffracted light L1-2 deflected by the deflection function.

As illustrated in FIG. 10, in a three-dimensional coordinate system of the image display device 2, a normal line of the first optical element 10 is in a +z axis direction (an upward direction in FIG. 10) from the origin of the three-dimensional coordinate system, and an upper surface (an upper surface in FIG. 10) of the first optical element 10 is an x-y plane (a plane extending from a front side to a back side of the paper surface). The incident light L0-2 which is incident on the first optical element 10 is light which is in the +z axis direction (the upward direction in FIG. 10) and extends from a certain point within a second quadrant range, within a third quadrant range, or on an −x axis (an axis in a left direction of FIG. 10) of an x-y coordinate system (a coordinate system extending from the front side to the back side of the paper surface) toward the origin of the three-dimensional coordinate system. The first diffracted light L1-2 emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 10) of the x-y coordinate system (a coordinate system extending from the front side to the back side of the paper surface). That is, the first diffracted light L1-2 is deflected in a substantially reverse regular reflection direction with respect to the incident light L0-2.

The second optical element 20 has a lens function for the first diffracted light L1-2 which has a predetermined wavelength and is incident on the second optical element 20 at a predetermined incidence angle.

Then, the second optical element 20 has a deflection function of deflecting the first diffracted light L1-2, which has a predetermined wavelength and is incident on the second optical element 20 at a predetermined incidence angle, to a side of the second optical element 20 on which the first diffracted light L1-2 is incident, and emits second diffracted light L2-2 deflected by the deflection function.

Then, in the image display device 2, a direction of the incidence angle of the incident light L0-2 and a direction of the diffraction angle of the first diffracted light L1-2 are different from a direction of the optical axis of the second optical element 20.

As described above, the content described for the image display device of the second embodiment (Example 2 of the image display device) according to the present technology can be applied to the above-described image display device of the first embodiment according to the present technology and the image display devices of the third to thirteenth embodiments according to the present technology to be described later as long as there is no particular technical inconsistency.

4. Third Embodiment (Example 3 of Image Display Device)

The image display device of the third embodiment (Example 3 of the image display device) according to the present technology will be described with reference to FIGS. 11A and 11B. One of features of the image display device of the third embodiment according to the present technology is that the angle of the light beam which is incident on the first optical element is set to an angle different from the angle of the light beam which is incident on the second optical element and the angle of the light beam diffracted by the second optical element. Therefore, in a case of the configuration in which the light beam transmits through the second optical element and is incident on the first optical element, the second optical element does not have an effect of reflecting and diffracting the light beam which is incident on the second optical element by condensing (convex lens) or diverging (concave lens) the light beam, and thus the light beam which is incident on the second optical element is transmitted.

FIGS. 11A and 11B are diagrams illustrating a configuration example of the image display device of the third embodiment according to the present technology. Specifically, FIG. 11A is a diagram illustrating the image display device 3-1, and FIG. 11B is a diagram illustrating the image display device 3-2.

(Image Display Device 3-1)

The image display device 3-1 includes at least an optical element unit including a first optical element 10 and a second optical element 20 facing each other. In the image display device 3-1, an image is formed on the basis of image display light (display light) L3-3A transmitted through the first optical element 10 and emitted to the outside of the image display device 2. In the image display device 3-1, the first optical element 10 and the second optical element 20 may be disposed close to each other. Although not illustrated in FIG. 11A, the first optical element 10 and the second optical element 20 may be disposed in contact with each other.

The first optical element 10 has a deflection function of deflecting incident light L0-3A, which has a predetermined wavelength and is incident on the first optical element 10 at a predetermined incidence angle, to a side of the first optical element 10 on which the incident light L0-3A is incident, and emits first diffracted light L1-3A deflected by the deflection function.

As illustrated in FIG. 11A, in a three-dimensional coordinate system of the image display device 3-1, a normal line of the first optical element 10 is in a +z axis direction (an upward direction in FIG. 11A) from the origin of the three-dimensional coordinate system, and an upper surface (an upper surface in FIG. 11A) of the first optical element 10 is an x-y plane (a plane extending from a front side to a back side of the paper surface). The incident light L0-3A which is incident on the first optical element 10 is light which is in the +z axis direction (the upward direction in FIG. 11A) and extends from a certain point within a second quadrant range, within a third quadrant range, or on an −x axis (an axis in a left direction of FIG. 11A) of an x-y coordinate system (a coordinate system extending from the front side to the back side of the paper surface) toward the origin of the three-dimensional coordinate system. The first diffracted light L1-3A emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 11A) of the x-y coordinate system (a coordinate system extending from the front side to the back side of the paper surface). That is, the first diffracted light L1-3A is deflected in a substantially reverse regular reflection direction with respect to the incident light L0-3A.

The second optical element 20 has a lens function for the first diffracted light L1-3A which has a predetermined wavelength and is incident on the second optical element 20 at a predetermined incidence angle.

Then, the second optical element 20 has a deflection function of deflecting the first diffracted light L1-3A, which has a predetermined wavelength and is incident on the second optical element 20 at a predetermined incidence angle, to a side of the second optical element 20 on which the first diffracted light L1-3A is incident, and emits second diffracted light L2-3A deflected by the deflection function.

Then, in the image display device 3-1, a direction of the incidence angle of the incident light L0-3A and a direction of the diffraction angle of the first diffracted light L1-3A are different from a direction of the optical axis of the second optical element 20.

(Image Display Device 3-2)

The image display device 3-2 includes at least an optical element unit including a first optical element 10 and a second optical element 20 facing each other. In the image display device 3-2, an image is formed on the basis of image display light (display light) L3-3B transmitted through the first optical element 10 and emitted to the outside of the image display device 3-2. In the image display device 3-2, the first optical element 10 and the second optical element 20 may be disposed close to each other. Although not illustrated in FIG. 11B, the first optical element 10 and the second optical element 20 may be disposed in contact with each other.

The first optical element 10 has a deflection function of deflecting incident light L0-3B, which has a predetermined wavelength and is incident on the first optical element 10 at a predetermined incidence angle, to a side of the first optical element 10 on which the incident light L0-3B is incident, and emits first diffracted light L1-3B deflected by the deflection function.

As illustrated in FIG. 11B, in a three-dimensional coordinate system of the image display device 3-2, a normal line of the first optical element 10 is in a +z axis direction (an upward direction in FIG. 11B) from the origin of the three-dimensional coordinate system, and an upper surface (an upper surface in FIG. 11B) of the first optical element 10 is an x-y plane (a plane extending from a front side to a back side of the paper surface). The incident light L0-3B which is incident on the first optical element 10 is light which is in the +z axis direction (the upward direction in FIG. 11B) and extends from a certain point within a second quadrant range, within a third quadrant range, or on an −x axis (an axis in a left direction of FIG. 11B) of an x-y coordinate system (a coordinate system extending from the front side to the back side of the paper surface) toward the origin of the three-dimensional coordinate system. The first diffracted light L1-3B emitted from the first optical element 10 is light which is in the +z axis direction (the upward direction in FIG. 11B) and extends from the origin of the three-dimensional coordinate system toward a certain point within a first quadrant range, within a fourth quadrant range, on an +x axis (an axis in a right direction of FIG. 11B), on a +y axis (an axis extending from the front side of the paper surface to the back side of the paper surface in FIG. 11B), or on a −y axis (an axis extending from the back side of the paper surface to the front side of the paper surface in FIG. 11B) of the x-y coordinate system (a coordinate system extending from the front side to the back side of the paper surface). That is, the first diffracted light L1-3B is deflected in a substantially regular reflection direction with respect to the incident light L0-3B.

The second optical element 20 has a lens function for the first diffracted light L1-3B which has a predetermined wavelength and is incident on the second optical element 20 at a predetermined incidence angle.

Then, the second optical element 20 has a deflection function of deflecting the first diffracted light L1-3B, which has a predetermined wavelength and is incident on the second optical element 20 at a predetermined incidence angle, to a side of the second optical element 20 on which the first diffracted light L1-3B is incident, and emits second diffracted light L2-3B deflected by the deflection function.

Then, in the image display device 3-2, a direction of the incidence angle of the incident light L0-3B and a direction of the diffraction angle of the first diffracted light L1-3B are different from a direction of the optical axis of the second optical element 20.

As described above, the content described for the image display device of the third embodiment (Example 3 of the image display device) according to the present technology can be applied to the above-described image display devices of the first and second embodiments according to the present technology and the image display devices of the fourth to thirteenth embodiments according to the present technology to be described later as long as there is no particular technical inconsistency.

5. Fourth Embodiment (Example 4 of Image Display Device)

The image display device of the fourth embodiment (Example 4 of the image display device) according to the present technology will be described with reference to FIGS. 12A and 12B. One of features of the image display device of the fourth embodiment according to the present technology is that the optical axis of the lens of the second optical element is inclined to be perpendicular to the second optical element.

FIGS. 12A and 12B are diagrams illustrating a configuration example of the image display device of the fourth embodiment according to the present technology. Specifically, FIG. 12A is a diagram illustrating the image display device 4-1, and FIG. 12B is a diagram illustrating the image display device 4-2.

(Image Display Device 4-1)

The image display device 4-1 includes at least an optical element unit including a first optical element 10 and a second optical element 20 facing each other. In the image display device 4-1, an image is formed on the basis of image display light (display light) L3-4A transmitted through the first optical element 10 and emitted to the outside of the image display device 4-1. In the image display device 4-1, the first optical element 10 and the second optical element 20 may be disposed close to each other. Although not illustrated in FIG. 12A, the first optical element 10 and the second optical element 20 may be disposed in contact with each other.

The first optical element 10 has a deflection function of deflecting incident light L0-4A, which has a predetermined wavelength and is incident on the first optical element 10 at a predetermined incidence angle, to a side of the first optical element 10 on which the incident light L0-4A is incident, and emits first diffracted light L1-4A deflected by the deflection function.

As illustrated in FIG. 12A, in a three-dimensional coordinate system of the image display device 4-1, a normal line of the first optical element 10 is in a +z axis direction (an upward direction in FIG. 12A) from the origin of the three-dimensional coordinate system, and an upper surface (an upper surface in FIG. 12A) of the first optical element 10 is an x-y plane (a plane extending from a front side to a back side of the paper surface). The incident light L0-4A which is incident on the first optical element 10 is light which is in the +z axis direction (the upward direction in FIG. 12A) and extends from a certain point within a second quadrant range, within a third quadrant range, or on an −x axis (an axis in a left direction of FIG. 12A) of an x-y coordinate system (a coordinate system extending from the front side to the back side of the paper surface) toward the origin of the three-dimensional coordinate system. The first diffracted light L1-4A emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 12A) of the x-y coordinate system (a coordinate system extending from the front side to the back side of the paper surface). That is, the first diffracted light L1-4A is deflected in a substantially reverse regular reflection direction with respect to the incident light L0-4A.

The second optical element 20 has a lens function for the first diffracted light L1-4A which has a predetermined wavelength and is incident on the second optical element 20 at a predetermined incidence angle.

Then, the second optical element 20 has a deflection function of deflecting the first diffracted light L1-4A, which has a predetermined wavelength and is incident on the second optical element 20 at a predetermined incidence angle, to a side of the second optical element 20 on which the first diffracted light L1-4A is incident, and emits second diffracted light L2-4A deflected by the deflection function.

In the image display device 4-1, a direction of the incidence angle of the incident light L0-4A and a direction of the diffraction angle of the first diffracted light L1-4A are different from a direction of the optical axis of the second optical element 20.

(Image Display Device 4-2)

The image display device 4-2 includes at least an optical element unit including a first optical element 10 and a second optical element 20 facing each other. In the image display device 4-2, an image is formed on the basis of image display light (display light) L3-4B transmitted through the first optical element 10 and emitted to the outside of the image display device 4-2. In the image display device 4-2, the first optical element 10 and the second optical element 20 may be disposed close to each other. Although not illustrated in FIG. 12B, the first optical element 10 and the second optical element 20 may be disposed in contact with each other.

The first optical element 10 has a deflection function of deflecting incident light L0-4B, which has a predetermined wavelength and is incident on the first optical element 10 at a predetermined incidence angle, to a side of the first optical element 10 on which the incident light L0-4B is incident, and emits first diffracted light L1-4B deflected by the deflection function.

As illustrated in FIG. 12B, in a three-dimensional coordinate system of the image display device 4-2, a normal line of the first optical element 10 is in a +z axis direction (an upward direction in FIG. 12B) from the origin of the three-dimensional coordinate system, and an upper surface (an upper surface in FIG. 12B) of the first optical element 10 is an x-y plane (a plane extending from a front side to a back side of the paper surface). The incident light L0-4B which is incident on the first optical element 10 is light which is in the +z axis direction (the upward direction in FIG. 12B) and extends from a certain point within a second quadrant range, within a third quadrant range, or on an −x axis (an axis in a left direction of FIG. 12B) of an x-y coordinate system (a coordinate system extending from the front side to the back side of the paper surface) toward the origin of the three-dimensional coordinate system. The first diffracted light L1-4B emitted from the first optical element 10 is light which is in the +z axis direction (the upward direction in FIG. 12B) and extends from the origin of the three-dimensional coordinate system toward a certain point within a first quadrant range, within a fourth quadrant range, on an +x axis (an axis in a right direction of FIG. 12B), on a +y axis (an axis extending from the front side of the paper surface to the back side of the paper surface in FIG. 12B), or on a −y axis (an axis extending from the back side of the paper surface to the front side of the paper surface in FIG. 12B) of the x-y coordinate system (a coordinate system extending from the front side to the back side of the paper surface). That is, the first diffracted light L1-4B is deflected in a substantially regular reflection direction with respect to the incident light L0-4B.

The second optical element 20 has a lens function for the first diffracted light L1-4B which has a predetermined wavelength and is incident on the second optical element 20 at a predetermined incidence angle.

Then, the second optical element 20 has a deflection function of deflecting the first diffracted light L1-4B, which has a predetermined wavelength and is incident on the second optical element 20 at a predetermined incidence angle, to a side of the second optical element 20 on which the first diffracted light L1-4B is incident, and emits second diffracted light L2-4B deflected by the deflection function.

In the image display device 4-2, a direction of the incidence angle of the incident light L0-4B and a direction of the diffraction angle of the first diffracted light L1-4B are different from a direction of the optical axis of the second optical element 20.

As described above, the content described for the image display device of the fourth embodiment (Example 4 of the image display device) according to the present technology can be applied to the above-described image display devices of the first to third embodiments according to the present technology and the image display devices of the fifth to thirteenth embodiments according to the present technology to be described later as long as there is no particular technical inconsistency.

6. Fifth Embodiment (Example 5 of Image Display Device)

The image display device of the fifth embodiment (Example 5 of the image display device) according to the present technology will be described with reference to FIG. 13. One of features of the image display device of the fifth embodiment according to the present technology is that a substrate (for example, a light guide plate, a GRIN lens, or the like) in contact with the first optical element is provided. The substrate (for example, a light guide plate, a GRIN lens, or the like) may be provided, for example, between the first optical element and the second optical element. The substrate (for example, a light guide plate, a GRIN lens, or the like) guides the light which is incident on the first optical element, the first optical element reflects and diffracts the guided light by deflecting the guided light, and the second optical element reflects and diffracts the reflected and diffracted light by the lens.

FIG. 13 is a diagram illustrating a configuration example of the image display device of the fifth embodiment according to the present technology. Specifically, FIG. 13 is a diagram illustrating the image display device 5.

(Image Display Device 5)

The image display device 5 includes at least an optical element unit including a first optical element 10 and a second optical element 20 facing each other. In the image display device 5, an image is formed on the basis of image display light (display light) L3-5 transmitted through the first optical element 10 and emitted to the outside of the image display device 5.

A light guide plate 500 is provided between the first optical element 10 and the second optical element 20. The light propagates in the light guide plate 500 while being reflected in order of the light L0-5-1 →the light L0-5-2 →the light L05-3. The light L05-3 is incident on the first optical element 10 as incident light.

The first optical element 10 has a deflection function of deflecting incident light L0-5-3, which has a predetermined wavelength and is incident on the first optical element 10 at a predetermined incidence angle, to a side of the first optical element 10 on which the incident light L0-5-3 is incident, and emits first diffracted light L1-5 deflected by the deflection function.

As illustrated in FIG. 13, in a three-dimensional coordinate system of the image display device 5, a normal line of the first optical element 10 is in a +z axis direction (an upward direction in FIG. 13) from the origin of the three-dimensional coordinate system, and an upper surface (an upper surface in FIG. 13) of the first optical element 10 is an x-y plane (a plane extending from a front side to a back side of the paper surface). The incident light L0-5-3 which is incident on the first optical element 10 is light which is in the +z axis direction (the upward direction in FIG. 13) and extends from a certain point within a second quadrant range, within a third quadrant range, or on an −x axis (an axis in a left direction of FIG. 13) of an x-y coordinate system (a coordinate system extending from the front side to the back side of the paper surface) toward the origin of the three-dimensional coordinate system. The first diffracted light L1-5 emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 13) of the x-y coordinate system (a coordinate system extending from the front side to the back side of the paper surface). That is, the first diffracted light L1-5 is deflected in a substantially reverse regular reflection direction with respect to the incident light L0-5-3.

The second optical element 20 has a lens function for the first diffracted light L1-5 which has a predetermined wavelength and is incident on the second optical element 20 at a predetermined incidence angle.

Then, the second optical element 20 has a deflection function of deflecting the first diffracted light L1-5, which has a predetermined wavelength and is incident on the second optical element 20 at a predetermined incidence angle, to a side of the second optical element 20 on which the first diffracted light L1-5 is incident, and emits second diffracted light L2-5 deflected by the deflection function.

In the image display device 5, a direction of the incidence angle of the incident light L0-5-3 and a direction of the diffraction angle of the first diffracted light L1-5 are different from a direction of the optical axis of the second optical element 20.

As described above, the content described for the image display device of the fifth embodiment (Example 5 of the image display device) according to the present technology can be applied to the above-described image display devices of the first to fourth embodiments according to the present technology and the image display devices of the sixth to thirteenth embodiments according to the present technology to be described later as long as there is no particular technical inconsistency.

7. Sixth Embodiment (Example 6 of Image Display Device)

The image display device of the sixth embodiment (Example 6 of the image display device) according to the present technology will be described with reference to FIG. 14.

FIG. 14 is a diagram illustrating a configuration example of the image display device of the sixth embodiment according to the present technology. Specifically, FIG. 14 is a diagram illustrating the image display device 6.

(Image Display Device 6)

The image display device 6 includes at least an optical element unit including a first optical element 10-1 and a second optical element 20-1 facing each other. In the image display device 6, an image is formed on the basis of image display light (display light) L3-6 transmitted through the first optical element 10-1 and emitted to the outside of the image display device 6. In the image display device 6, the first optical element 10-1 and the second optical element 20-1 may be disposed close to each other. Although not illustrated in FIG. 14, the first optical element 10-1 and the second optical element 20-1 may be disposed in contact with each other.

Each of the first optical element 10-1 and the second optical element 20-1 may be any one optical element of a volume-type hologram optical element, a diffraction grating optical element, or a meta-surface optical element.

In the image display device 6, the first optical element 10-1 has a curved surface shape in which the substantially center portion of the first optical element 10-1 has an upward convex shape T1-6, and the second optical element 20-1 has a curved surface shape in which the substantially center portion of the second optical element 20-1 has an upward convex shape T2-6.

The first optical element 10-1 has a deflection function of deflecting incident light L0-6, which has a predetermined wavelength and is incident on the first optical element 10-1 at a predetermined incidence angle, to a side of the first optical element 10 on which the incident light L0-6 is incident, and emits first diffracted light L1-6 deflected by the deflection function.

As illustrated in FIG. 14, in a three-dimensional coordinate system of the image display device 6, a normal line of the first optical element 10-1 is in a +z axis direction (an upward direction in FIG. 14) from the origin of the three-dimensional coordinate system, and an upper surface (an upper surface in FIG. 14) of the first optical element 10-1 is an x-y plane (a plane extending from a front side to a back side of the paper surface) (in a case where a convex level of an upward convex shape T1-6 is small, the x-y plane can be approximated to be the upper surface of the first optical element 10 as described on the left, but in a case where a convex level of the convex shape T1-6 is large, the x-y plane touches the origin of the three-dimensional coordinate system within a region of the upper surface of the first optical element 10-1). The incident light L0-6 which is incident on the first optical element 10-1 is light which is in the +z axis direction (the upward direction in FIG. 14) and extends from a certain point within a second quadrant range, within a third quadrant range, or on an −x axis (an axis in a left direction of FIG. 14) of an x-y coordinate system (a coordinate system extending from the front side to the back side of the paper surface) toward the origin of the three-dimensional coordinate system. The first diffracted light L1-6 emitted from the first optical element 10-1 is light which is in the +z axis direction (the upward direction in FIG. 14) and extends from the origin of the three-dimensional coordinate system toward a certain point within a first quadrant range, within a fourth quadrant range, on an +x axis (an axis in a right direction of FIG. 14), on a +y axis (an axis extending from the front side of the paper surface to the back side of the paper surface in FIG. 14), or on a −y axis (an axis extending from the back side of the paper surface to the front side of the paper surface in FIG. 14) of the x-y coordinate system (a coordinate system extending from the front side to the back side of the paper surface). That is, the first diffracted light L1-6 is deflected in a substantially regular reflection direction with respect to the incident light L0-6.

The second optical element 20-1 has a lens function for the first diffracted light L1-6 which has a predetermined wavelength and is incident on the second optical element 20-1 at a predetermined incidence angle.

Then, the second optical element 20-1 has a deflection function of deflecting the first diffracted light L1-6, which has a predetermined wavelength and is incident on the second optical element 20-1 at a predetermined incidence angle, to a side of the second optical element 20-1 on which the first diffracted light L1-6 is incident, and emits second diffracted light L2-6 deflected by the deflection function.

In the image display device 6, a direction of the incidence angle of the incident light L0-6 and a direction of the diffraction angle of the first diffracted light L1-6 are different from a direction of the optical axis of the second optical element 20-1.

As described above, the content described for the image display device of the sixth embodiment (Example 6 of the image display device) according to the present technology can be applied to the above-described image display devices of the first to fifth embodiments according to the present technology and the image display devices of the seventh to thirteenth embodiments according to the present technology to be described later as long as there is no particular technical inconsistency.

8. Seventh Embodiment (Example 7 of Image Display Device)

The image display device of the seventh embodiment (Example 7 of the image display device) according to the present technology will be described with reference to FIG. 15.

Figure 15:
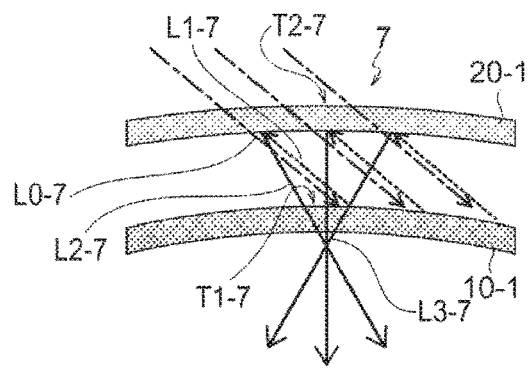
FIG. 15 is a diagram illustrating a configuration example of an image display device of a seventh embodiment to which the present technology is applied.

FIG. 15 is a diagram illustrating a configuration example of the image display device of the seventh embodiment according to the present technology. Specifically, FIG. 15 is a diagram illustrating the image display device 7.
(Image Display Device 7)

The image display device 7 includes at least an optical element unit including a first optical element 10-1 and a second optical element 20-1 facing each other. In the image display device 7, an image is formed on the basis of image display light (display light) L3-7 transmitted through the first optical element 10-1 and emitted to the outside of the image display device 7. In the image display device 7, the first optical element 10-1 and the second optical element 20-1 may be disposed close to each other. Although not illustrated in FIG. 15, the first optical element 10-1 and the second optical element 20-1 may be disposed in contact with each other.

In the image display device 7, the first optical element 10-1 has a curved surface shape in which the substantially center portion of the first optical element 10-1 has an upward convex shape T1-7, and the second optical element 20-1 has a curved surface shape in which the substantially center portion of the second optical element 20-1 has an upward convex shape T2-7.

The first optical element 10-1 has a deflection function of deflecting incident light L0-7, which has a predetermined wavelength and is incident on the first optical element 10-1 at a predetermined incidence angle, to a side of the first optical element 10 on which the incident light L0-7 is incident, and emits first diffracted light L1-7 deflected by the deflection function.

As illustrated in FIG. 15, in a three-dimensional coordinate system of the image display device 7, a normal line of the first optical element 10-1 is in a +z axis direction (an upward direction in FIG. 15) from the origin of the three-dimensional coordinate system, and an upper surface (an upper surface in FIG. 15) of the first optical element 10-1 is an x-y plane (a plane extending from a front side to a back side of the paper surface) (in a case where a convex level of an upward convex shape T1-7 is small, the x-y plane can be approximated to be the upper surface of the first optical element 10-1 as described on the left, but in a case where a convex level of the convex shape T1-7 is large, the x-y plane touches the origin of the three-dimensional coordinate system within a region of the upper surface of the first optical element 10-1). The incident light L0-7 which is incident on the first optical element 10-1 is light which is in the +z axis direction (the upward direction in FIG. 15) and extends from a certain point within a second quadrant range, within a third quadrant range, or on an −x axis (an axis in a left direction of FIG. 15) of an x-y coordinate system (a coordinate system extending from the front side to the back side of the paper surface) toward the origin of the three-dimensional coordinate system. The first diffracted light L1-7 emitted from the first optical element 10-1 is light which is in the +z axis direction and extends from the origin of the three-dimensional coordinate system toward a certain point within a second quadrant range, within a third quadrant range, or on the −x axis (an axis in the left direction of FIG. 15) of the x-y coordinate system (a coordinate system extending from the front side to the back side of the paper surface). That is, the first diffracted light L1-7 is deflected in a substantially reverse regular reflection direction with respect to the incident light L0-7.

The second optical element 20-1 has a lens function for the first diffracted light L1-7 which has a predetermined wavelength and is incident on the second optical element 20-1 at a predetermined incidence angle.

Then, the second optical element 20-1 has a deflection function of deflecting the first diffracted light L1-7, which has a predetermined wavelength and is incident on the second optical element 20-1 at a predetermined incidence angle, to a side of the second optical element 20-1 on which the first diffracted light L1-7 is incident, and emits second diffracted light L2-7 deflected by the deflection function.

In the image display device 7, a direction of the incidence angle of the incident light L0-7 and a direction of the diffraction angle of the first diffracted light L1-7 are different from a direction of the optical axis of the second optical element 20-1.

As described above, the content described for the image display device of the seventh embodiment (Example 7 of the image display device) according to the present technology can be applied to the above-described image display devices of the first to sixth embodiments according to the present technology and the image display devices of the eighth to thirteenth embodiments according to the present technology to be described later as long as there is no particular technical inconsistency.

9. Eighth Embodiment (Example 8 of Image Display Device)

The image display device of the eighth embodiment (Example 8 of the image display device) according to the present technology will be described with reference to FIG. 16. In the image display device of the eighth embodiment according to the present technology, the first optical element is a lens HOE that diffracts an incident light beam in a substantially regular reflection direction, and the second optical element is a reflective lens HOE that condenses or diverges the incident light beam (diffracted light beam) from the first optical element.

Figure 16:
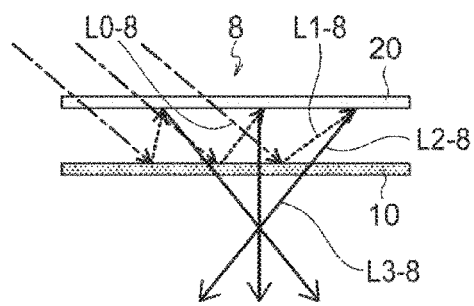
FIG. 16 is a diagram illustrating a configuration example of an image display device of an eighth embodiment to which the present technology is applied.

FIG. 16 is a diagram illustrating a configuration example of the image display device of the eighth embodiment according to the present technology. Specifically, FIG. 16 is a diagram illustrating the image display device 8.
(Image Display Device 8)

The image display device 8 includes at least an optical element unit including a first optical element 10 and a second optical element 20 facing each other. In the image display device 8, an image is formed on the basis of image display light (display light) L3-8 transmitted through the first optical element 10 and emitted to the outside of the image display device 8. In the image display device 8, the first optical element 10 and the second optical element 20 may be disposed close to each other. Although not illustrated in FIG. 16, the first optical element 10 and the second optical element 20 may be disposed in contact with each other.

The first optical element 10 has a deflection function of deflecting incident light L0-8, which has a predetermined wavelength and is incident on the first optical element 10 at a predetermined incidence angle, to a side of the first optical element 10 on which the incident light L0-8 is incident, and emits first diffracted light L1-8 deflected by the deflection function.

As illustrated in FIG. 16, in a three-dimensional coordinate system of the image display device 8, a normal line of the first optical element 10 is in a +z axis direction (an upward direction in FIG. 16) from the origin of the three-dimensional coordinate system, and an upper surface (an upper surface in FIG. 16) of the first optical element 10 is an x-y plane (a plane extending from a front side to a back side of the paper surface). The incident light L0-8 which is incident on the first optical element 10 is light which is in the +z axis direction (the upward direction in FIG. 16) and extends from a certain point within a second quadrant range, within a third quadrant range, or on an −x axis (an axis in a left direction of FIG. 16) of an x-y coordinate system (a coordinate system extending from the front side to the back side of the paper surface) toward the origin of the three-dimensional coordinate system. The first diffracted light L1-8 emitted from the first optical element 10 is light which is in the +z axis direction (the upward direction in FIG. 16) and extends from the origin of the three-dimensional coordinate system toward a certain point within a first quadrant range, within a fourth quadrant range, on an +x axis (an axis in a right direction of FIG. 16), on a +y axis (an axis extending from the front side of the paper surface to the back side of the paper surface in FIG. 16), or on a −y axis (an axis extending from the back side of the paper surface to the front side of the paper surface in FIG. 16) of the x-y coordinate system (a coordinate system extending from the front side to the back side of the paper surface). That is, the first diffracted light L1-8 is deflected in a substantially regular reflection direction with respect to the incident light L0-8.

The second optical element 20 has a lens function for the first diffracted light L1-8 which has a predetermined wavelength and is incident on the second optical element 20 at a predetermined incidence angle.

Then, the second optical element 20 has a deflection function of deflecting the first diffracted light L1-8, which has a predetermined wavelength and is incident on the second optical element 20 at a predetermined incidence angle, to a side of the second optical element 20 on which the first diffracted light L1-8 is incident, and emits second diffracted light L2-8 deflected by the deflection function.

In the image display device 8, a direction of the incidence angle of the incident light L0-8 and a direction of the diffraction angle of the first diffracted light L1-8 are different from a direction of the optical axis of the second optical element 20.

As described above, the content described for the image display device of the eighth embodiment (Example 8 of the image display device) according to the present technology can be applied to the above-described image display devices of the first to seventh embodiments according to the present technology and the image display devices of the ninth to thirteenth embodiments according to the present technology to be described later as long as there is no particular technical inconsistency.

10. Ninth Embodiment (Example 9 of Image Display Device)

The image display device of the ninth embodiment (Example 9 of the image display device) according to the present technology will be described with reference to FIG. 17. In the image display device of the ninth embodiment according to the present technology, the first optical element is a lens HOE that diffracts an incident light beam in a substantially reverse regular reflection direction, and the second optical element is a reflective lens HOE that condenses or diverges the incident light beam (diffracted light beam) from the first optical element.

Figure 17:
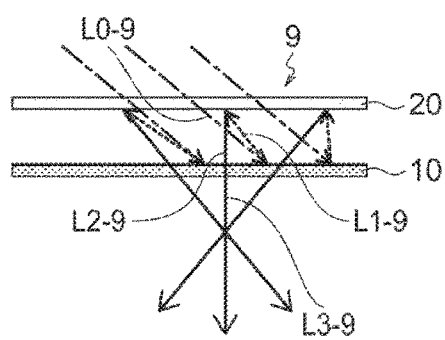
FIG. 17 is a diagram illustrating a configuration example of an image display device of a ninth embodiment to which the present technology is applied.

FIG. 17 is a diagram illustrating a configuration example of the image display device of the ninth embodiment according to the present technology. Specifically, FIG. 17 is a diagram illustrating the image display device 9.

(Image Display Device 9)

The image display device 9 includes at least an optical element unit including a first optical element 10 and a second optical element 20 facing each other. In the image display device 9, an image is formed on the basis of image display light (display light) L3-9 transmitted through the first optical element 10 and emitted to the outside of the image display device 9. In the image display device 9, the first optical element 10 and the second optical element 20 may be disposed close to each other. Although not illustrated in FIG. 17, the first optical element 10 and the second optical element 20 may be disposed in contact with each other.

The first optical element 10 has a deflection function of deflecting incident light L0-9, which has a predetermined wavelength and is incident on the first optical element 10 at a predetermined incidence angle, to a side of the first optical element 10 on which the incident light L0-9 is incident, and emits first diffracted light L1-9 deflected by the deflection function.

As illustrated in FIG. 17, in a three-dimensional coordinate system of the image display device 9, a normal line of the first optical element 10 is in a +z axis direction (an upward direction in FIG. 17) from the origin of the three-dimensional coordinate system, and an upper surface (an upper surface in FIG. 17) of the first optical element 10 is an x-y plane (a plane extending from a front side to a back side of the paper surface). The incident light L0-9 which is incident on the first optical element 10 is light which is in the +z axis direction (the upward direction in FIG. 17) and extends from a certain point within a second quadrant range, within a third quadrant range, or on an −x axis (an axis in a left direction of FIG. 17) of an x-y coordinate system (a coordinate system extending from the front side to the back side of the paper surface) toward the origin of the three-dimensional coordinate system. The first diffracted light L1-9 emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 17) of the x-y coordinate system (a coordinate system extending from the front side to the back side of the paper surface). That is, the first diffracted light L1-9 is deflected in a substantially reverse regular reflection direction with respect to the incident light L0-9.

The second optical element 20 has a lens function for the first diffracted light L1-9 which has a predetermined wavelength and is incident on the second optical element 20 at a predetermined incidence angle.

Then, the second optical element 20 has a deflection function of deflecting the first diffracted light L1-9, which has a predetermined wavelength and is incident on the second optical element 20 at a predetermined incidence angle, to a side of the second optical element 20 on which the first diffracted light L1-9 is incident, and emits second diffracted light L2-9 deflected by the deflection function.

In the image display device 9, a direction of the incidence angle of the incident light L0-9 and a direction of the diffraction angle of the first diffracted light L1-9 are different from a direction of the optical axis of the second optical element 20.

As described above, the content described for the image display device of the ninth embodiment (Example 9 of the image display device) according to the present technology can be applied to the above-described image display devices of the first to eighth embodiments according to the present technology and the image display devices of the tenth to thirteenth embodiments according to the present technology to be described later as long as there is no particular technical inconsistency.

11. Tenth Embodiment (Example 10 of Image Display Device)

The image display device of the tenth embodiment (Example 10 of the image display device) according to the present technology will be described with reference to FIG. 18. In the image display device of the tenth embodiment according to the present technology, the first optical element is a HOE that has a substantially regular reflection type and diffracts incident light in a substantially regular reflection direction. The third optical element is a reflection HOE, and the third optical element diffracts the diffracted light at an angle different from the incidence angle of the incident light which is incident on the first optical element and the diffraction angle of the diffracted light from the first optical element. The diffracted light transmits through the first optical element, and the second optical element is a transmission type lens HOE that diffracts the diffracted light by condensing or diverging the diffracted light from the third optical element.

Figure 18:
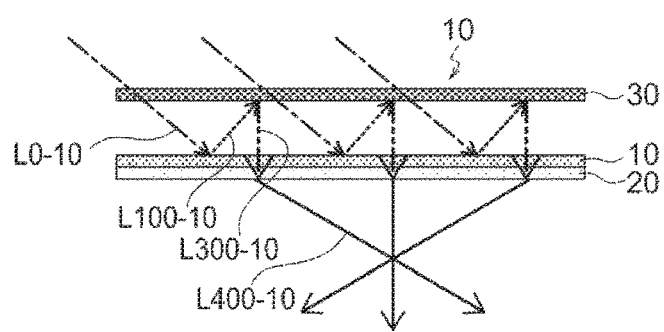
FIG. 18 is a diagram illustrating a configuration example of an image display device of a tenth embodiment to which the present technology is applied.

FIG. 18 is a diagram illustrating a configuration example of the image display device of the tenth embodiment according to the present technology. Specifically, FIG. 18 is a diagram illustrating the image display device 10.

(Image Display Device 10)

The image display device 10 includes at least an optical element unit including a first optical element 10, a second optical element 20, and a third optical element 30 facing each other. In the image display device 10, an image is formed on the basis of image display light (display light) L400-10 transmitted through the first optical element 10 and emitted to the outside of the image display device 10. In the image display device 10, the first optical element 10 and the third optical element 30 may be disposed close to each other.

Although not illustrated in FIG. 18, the first optical element 10 and the second optical element 20 may be disposed in contact with each other. Further, as illustrated in FIG. 18, in the image display device 10, although the first optical element 10 and the second optical element 20 are disposed in contact with each other, the first optical element 10 and the second optical element 20 may be disposed close to each other.

The first optical element 10 has a deflection function of deflecting incident light L0-10, which has a predetermined wavelength and is incident on the first optical element 10 at a predetermined incidence angle, to a side of the first optical element 10 on which the incident light L0-10 is incident, and emits first diffracted light L100-10 deflected by the deflection function.

As illustrated in FIG. 18, in a three-dimensional coordinate system of the image display device 10, a normal line of the first optical element 10 is in a +z axis direction (an upward direction in FIG. 18) from the origin of the three-dimensional coordinate system, and an upper surface (an upper surface in FIG. 18) of the first optical element 10 is an x-y plane (a plane extending from a front side to a back side of the paper surface). The incident light L0-10 which is incident on the first optical element 10 is light which is in the +z axis direction (the upward direction in FIG. 18) and extends from a certain point within a second quadrant range, within a third quadrant range, or on an −x axis (an axis in a left direction of FIG. 18) of an x-y coordinate system (a coordinate system extending from the front side to the back side of the paper surface) toward the origin of the three-dimensional coordinate system. The first diffracted light L100-10 emitted from the first optical element 10 is light which is in the +z axis direction (the upward direction in FIG. 18) and extends from the origin of the three-dimensional coordinate system toward a certain point within a first quadrant range, within a fourth quadrant range, on an +x axis (an axis in a right direction of FIG. 18), on a +y axis (an axis extending from the front side of the paper surface to the back side of the paper surface in FIG. 18), or on a −y axis (an axis extending from the back side of the paper surface to the front side of the paper surface in FIG. 18) of the x-y coordinate system (a coordinate system extending from the front side to the back side of the paper surface). That is, the first diffracted light L100-10 is deflected in a substantially regular reflection direction with respect to the incident light L0-10.

The third optical element 30 has a deflection function of deflecting the first diffracted light L100-10, which has a predetermined wavelength and is incident on the third optical element 30 at a predetermined incidence angle, to a side of the third optical element 30 on which the first diffracted light L100-10 is incident, and emits third diffracted light L300-10 deflected by the deflection function.

The second optical element 30 has a lens function for the third diffracted light L300-10, which has a predetermined wavelength, transmits through the first optical element 10, and is incident on the second optical element 20 at a predetermined incidence angle. The second optical element 30 has a deflection function of deflecting the third diffracted light L300-10 to a side opposite to the side on which the third diffracted light L300-10 is incident, and emits fourth diffracted light L400-10 deflected by the deflection function as image display light.

Then, in the image display device 10, a direction of the incidence angle of the incident light L0-10 and a direction of the diffraction angle of the first diffracted light L100-10 are different from a direction of the diffraction angle of the third diffracted light L300-10. Note that the direction of the incidence angle of the incident light L0-10, the direction of the diffraction angle of the first diffracted light L100-10, and the direction of the diffraction angle of the third diffracted light L300-10 may be different from or may not different from the direction of the optical axis of the second optical element 20. That is, the direction of the incidence angle of the incident light L0-10, the direction of the diffraction angle of the first diffracted light L100-10, and the direction of the diffraction angle of the third diffracted light L300-10 are not influenced by the direction of the optical axis of the second optical element 20, and the fourth diffracted light L400-10 is emitted as the image display light.

As described above, the content described for the image display device of the tenth embodiment (Example 10 of the image display device) according to the present technology can be applied to the above-described image display devices of the first to ninth embodiments according to the present technology and the image display devices of the eleventh to thirteenth embodiments according to the present technology to be described later as long as there is no particular technical inconsistency.

12. Eleventh Embodiment (Example 11 of Image Display Device)

The image display device of the eleventh embodiment (Example 11 of the image display device) according to the present technology will be described with reference to FIG. 19. In the image display device of the eleventh embodiment according to the present technology, the first optical element is a HOE that has a substantially reverse regular reflection type and diffracts incident light in a substantially reverse regular reflection direction. The third optical element is a reflection HOE, and the third optical element diffracts the diffracted light at an angle different from the incidence angle of the incident light which is incident on the first optical element and the diffraction angle of the diffracted light from the first optical element. The diffracted light transmits through the first optical element, and the second optical element is a transmission type lens HOE that diffracts the diffracted light by condensing or diverging the diffracted light from the third optical element.

FIG. 19 is a diagram illustrating a configuration example of the image display device of the eleventh embodiment according to the present technology. Specifically, FIG. 19 is a diagram illustrating the image display device 11.

(Image Display Device 11)

The image display device 11 includes at least an optical element unit including a first optical element 10, a second optical element 20, and a third optical element 30 facing each other. In the image display device 11, an image is formed on the basis of image display light (display light) L400-11 transmitted through the first optical element 10 and emitted to the outside of the image display device 11. In the image display device 11, the first optical element 10 and the third optical element 30 may be disposed close to each other. Although not illustrated in FIG. 19, the first optical element 10 and the second optical element 20 may be disposed in contact with each other. Further, as illustrated in FIG. 19, in the image display device 11, although the first optical element 10 and the second optical element 20 are disposed in contact with each other, the first optical element 10 and the second optical element 20 may be disposed close to each other.

The first optical element 10 has a deflection function of deflecting incident light L0-11, which has a predetermined wavelength and is incident on the first optical element 10 at a predetermined incidence angle, to a side of the first optical element 10 on which the incident light L0-11 is incident, and emits first diffracted light L100-11 deflected by the deflection function.

As illustrated in FIG. 19, in a three-dimensional coordinate system of the image display device 11, a normal line of the first optical element 10 is in a +z axis direction (an upward direction in FIG. 19) from the origin of the three-dimensional coordinate system, and an upper surface (an upper surface in FIG. 19) of the first optical element 10 is an x-y plane (a plane extending from a front side to a back side of the paper surface). The incident light L0-11 which is incident on the first optical element 10 is light which is in the +z axis direction (the upward direction in FIG. 19) and extends from a certain point within a second quadrant range, within a third quadrant range, or on an −x axis (an axis in a left direction of FIG. 19) of an x-y coordinate system (a coordinate system extending from the front side to the back side of the paper surface) toward the origin of the three-dimensional coordinate system. The first diffracted light L100-11 emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 19) of the x-y coordinate system (a coordinate system extending from the front side to the back side of the paper surface). That is, the first diffracted light L100-11 is deflected in a substantially reverse regular reflection direction with respect to the incident light L0-11.

The third optical element 30 has a deflection function of deflecting the first diffracted light L100-11, which has a predetermined wavelength and is incident on the third optical element 30 at a predetermined incidence angle, to a side of the third optical element 30 on which the first diffracted light L100-11 is incident, and emits third diffracted light L300-11 deflected by the deflection function.

The second optical element 30 has a lens function for the third diffracted light L300-11, which transmits through the first optical element 10, has a predetermined wavelength, and is incident on the second optical element 20 at a predetermined incidence angle. The second optical element 30 has a deflection function of deflecting the third diffracted light L300-11 to a side opposite to the side on which the third diffracted light L300-11 is incident, and emits fourth diffracted light L400-11 deflected by the deflection function as image display light.

Then, in the image display device 11, a direction of the incidence angle of the incident light L0-11 and a direction of the diffraction angle of the first diffracted light L100-11 are different from a direction of the diffraction angle of the third diffracted light L300-11. Note that the direction of the incidence angle of the incident light L0-11, the direction of the diffraction angle of the first diffracted light L100-11, and the direction of the diffraction angle of the third diffracted light L300-11 may be different from or may not different from the direction of the optical axis of the second optical element 20. That is, the direction of the incidence angle of the incident light L0-11, the direction of the diffraction angle of the first diffracted light L100-11, and the direction of the diffraction angle of the third diffracted light L300-11 are not influenced by the direction of the optical axis of the second optical element 20, and the fourth diffracted light L400-11 is emitted as the image display light.

As described above, the content described for the image display device of the eleventh embodiment (Example 11 of the image display device) according to the present technology can be applied to the above-described image display devices of the first to tenth embodiments according to the present technology and the image display devices of the twelfth and thirteenth embodiments according to the present technology to be described later as long as there is no particular technical inconsistency.

13. Twelfth Embodiment (Example 12 of Image Display Device)

The image display device of the twelfth embodiment (Example 12 of the image display device) according to the present technology will be described with reference to FIG. 20. One of features of the image display device of the twelfth embodiment according to the present technology is that the angle of the light beam which is incident on the first optical element is set to an angle different from the angle of the light beam which is incident on the second optical element and the angle of the light beam diffracted by the second optical element. Moreover, one of the features of the image display device is that the optical axis of the lens formed by the second optical element is inclined to be perpendicular to the second optical element. Therefore, in a case of the configuration in which the light beam transmits through the second optical element and is incident on the first optical element, the second optical element does not have an effect of reflecting and diffracting the light beam which is incident on the second optical element by condensing (convex lens) or diverging (concave lens) the light beam, and thus the light beam which is incident on the second optical element is transmitted.

FIG. 20 is a diagram illustrating a configuration example of the image display device of the twelfth embodiment according to the present technology. Specifically, FIG. 20 is a diagram illustrating the image display device 12.

(Image Display Device 12)

The image display device 12 includes at least an optical element unit including a first optical element 10 and a second optical element 20 facing each other. In the image display device 12, an image is formed on the basis of image display light (display light) L3-12 transmitted through the first optical element 10 and emitted to the outside of the image display device 12. In the image display device 12, the first optical element 10 and the second optical element 20 may be disposed close to each other. Although not illustrated in FIG. 20, the first optical element 10 and the second optical element 20 may be disposed in contact with each other.

The first optical element 10 has a deflection function of deflecting incident light L0-12, which has a predetermined wavelength and is incident on the first optical element 10 at a predetermined incidence angle, to a side of the first optical element 10 on which the incident light L0-12 is incident, and emits first diffracted light L1-12 deflected by the deflection function.

As illustrated in FIG. 20, in a three-dimensional coordinate system of the image display device 12, a normal line of the first optical element 10 is in a +z axis direction (an upward direction in FIG. 20) from the origin of the three-dimensional coordinate system, and an upper surface (an upper surface in FIG. 20) of the first optical element 10 is an x-y plane (a plane extending from a front side to a back side of the paper surface). The incident light L0-12 which is incident on the first optical element 10 is light which is in the +z axis direction (the upward direction in FIG. 20) and extends from a certain point within a second quadrant range, within a third quadrant range, or on an −x axis (an axis in a left direction of FIG. 20) of an x-y coordinate system (a coordinate system extending from the front side to the back side of the paper surface) toward the origin of the three-dimensional coordinate system. The first diffracted light L1-12 emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 20) of the x-y coordinate system (a coordinate system extending from the front side to the back side of the paper surface). That is, the first diffracted light L1-12 is deflected in a substantially reverse regular reflection direction with respect to the incident light L0-12.

The second optical element 20 has a lens function for the first diffracted light L1-12 which has a predetermined wavelength and is incident on the second optical element 20 at a predetermined incidence angle.

Then, the second optical element 20 has a deflection function of deflecting the first diffracted light L1-12, which has a predetermined wavelength and is incident on the second optical element 20 at a predetermined incidence angle, to a side of the second optical element 20 on which the first diffracted light L1-12 is incident, and emits second diffracted light L2-12 deflected by the deflection function.

In the image display device 12, a direction of the incidence angle of the incident light L0-12 and a direction of the diffraction angle of the first diffracted light L1-12 are different from a direction of the optical axis of the second optical element 20.

As described above, the content described for the image display device of the twelfth embodiment (Example 12 of the image display device) according to the present technology can be applied to the above-described image display devices of the first to eleventh embodiments according to the present technology and the image display devices of the thirteenth embodiment according to the present technology to be described later as long as there is no particular technical inconsistency.

14. Thirteenth Embodiment (Example 13 of Image Display Device)

The image display device of the thirteenth embodiment (Example 13 of the image display device) according to the present technology will be described with reference to FIGS. 21A and 21B. One of features of the image display device of the thirteenth embodiment according to the present technology is that an angle of the light beam which is incident on the first optical element and is diffracted by the first optical element is larger than a traveling angle of the light beam according to the second optical element having a lens function (an incidence angle of the light from the first optical element toward the second optical element is larger than FOV/2). Note that a region in which the diffraction efficiency decreases is excluded from the FOV.

FIGS. 21A and 21B are diagrams illustrating a configuration example of the image display device of the thirteenth embodiment according to the present technology. Specifically, FIG. 21A is a diagram illustrating the image display device 13-1, and FIG. 21B is a diagram illustrating the image display device 13-2.

(Image Display Device 13-1)

The image display device 13-1 includes at least an optical element unit including a first optical element 10 and a second optical element 20 facing each other. In the image display device 13-1, an image is formed on the basis of image display light (display light) L3-13A transmitted through the first optical element 10 and emitted to the outside of the image display device 13-1. In the image display device 13-1, the first optical element 10 and the second optical element 20 may be disposed close to each other. Although not illustrated in FIG. 21A, the first optical element 10 and the second optical element 20 may be disposed in contact with each other.

The first optical element 10 has a deflection function of deflecting incident light L0-13A, which has a predetermined wavelength and is incident on the first optical element 10 at a predetermined incidence angle, to a side of the first optical element 10 on which the incident light L0-13A is incident, and emits first diffracted light L1-13A deflected by the deflection function.

As illustrated in FIG. 21A, in a three-dimensional coordinate system of the image display device 13-1, a normal line of the first optical element 10 is in a +z axis direction (an upward direction in FIG. 21A) from the origin of the three-dimensional coordinate system, and an upper surface (an upper surface in FIG. 21A) of the first optical element 10 is an x-y plane (a plane extending from a front side to a back side of the paper surface). The incident light L0-13A which is incident on the first optical element 10 is light which is in the +z axis direction (the upward direction in FIG. 21A) and extends from a certain point within a second quadrant range, within a third quadrant range, or on an −x axis (an axis in a left direction of FIG. 21A) of an x-y coordinate system (a coordinate system extending from the front side to the back side of the paper surface) toward the origin of the three-dimensional coordinate system. The first diffracted light L1-13A emitted from the first optical element 10 is light which is in the +z axis direction and extends from the origin of the three-dimensional coordinate system toward a certain point within a second quadrant range, within a third quadrant range, or on the −x axis (the axis in the left direction of FIG. 21A) of the x-y coordinate system (a coordinate system extending from the front side to the back side of the paper surface). That is, the first diffracted light L1-13A is deflected in a substantially reverse regular reflection direction with respect to the incident light L0-13A.

The second optical element 20 has a lens function for the first diffracted light L1-13A which has a predetermined wavelength and is incident on the second optical element 20 at a predetermined incidence angle.

Then, the second optical element 20 has a deflection function of deflecting the first diffracted light L1-13A, which has a predetermined wavelength and is incident on the second optical element 20 at a predetermined incidence angle, to a side of the second optical element 20 on which the first diffracted light L1-13A is incident, and emits second diffracted light L2-13A deflected by the deflection function.

In the image display device 13-1, a direction of the incidence angle of the incident light L0-13A and a direction of the diffraction angle of the first diffracted light L1-13A are different from a direction of the optical axis of the second optical element 20.

(Image Display Device 13-2)

The image display device 13-2 includes at least an optical element unit including a first optical element 10 and a second optical element 20 facing each other. In the image display device 13-2, an image is formed on the basis of image display light (display light) L3-13B transmitted through the first optical element 10 and emitted to the outside of the image display device 13-2. In the image display device 13-2, the first optical element 10 and the second optical element 20 may be disposed close to each other. Although not illustrated in FIG. 21B, the first optical element 10 and the second optical element 20 may be disposed in contact with each other.

The first optical element 10 has a deflection function of deflecting incident light L0-13B, which has a predetermined wavelength and is incident on the first optical element 10 at a predetermined incidence angle, to a side of the first optical element 10 on which the incident light L0-13B is incident, and emits first diffracted light L1-13B deflected by the deflection function.

As illustrated in FIG. 21B, in a three-dimensional coordinate system of the image display device 13-2, a normal line of the first optical element 10 is in a +z axis direction (an upward direction in FIG. 21B) from the origin of the three-dimensional coordinate system, and an upper surface (an upper surface in FIG. 21B) of the first optical element 10 is an x-y plane (a plane extending from a front side to a back side of the paper surface). The incident light L0-13B which is incident on the first optical element 10 is light which is in the +z axis direction (the upward direction in FIG. 21B) and extends from a certain point within a second quadrant range, within a third quadrant range, or on an −x axis (an axis in a left direction of FIG. 21B) of an x-y coordinate system (a coordinate system extending from the front side to the back side of the paper surface) toward the origin of the three-dimensional coordinate system. The first diffracted light L1-13B emitted from the first optical element 10 is light which is in the +z axis direction (the upward direction in FIG. 21B) and extends from the origin of the three-dimensional coordinate system toward a certain point within a first quadrant range, within a fourth quadrant range, on an +x axis (an axis in a right direction of FIG. 21B), on a +y axis (an axis extending from the front side of the paper surface to the back side of the paper surface in FIG. 21B), or on a −y axis (an axis extending from the back side of the paper surface to the front side of the paper surface in FIG. 21B) of the x-y coordinate system (a coordinate system extending from the front side to the back side of the paper surface). That is, the first diffracted light L1-13B is deflected in a substantially regular reflection direction with respect to the incident light L0-13B.

The second optical element 20 has a lens function for the first diffracted light L1-13B which has a predetermined wavelength and is incident on the second optical element 20 at a predetermined incidence angle.

Then, the second optical element 20 has a deflection function of deflecting the first diffracted light L1-13B, which has a predetermined wavelength and is incident on the second optical element 20 at a predetermined incidence angle, to a side of the second optical element 20 on which the first diffracted light L1-13B is incident, and emits second diffracted light L2-13B deflected by the deflection function.

In the image display device 13-2, a direction of the incidence angle of the incident light L0-13B and a direction of the diffraction angle of the first diffracted light L1-13B are different from a direction of the optical axis of the second optical element 20.

As described above, the content described for the image display device of the thirteenth embodiment (Example 13 of the image display device) according to the present technology can be applied to the above-described image display devices of the first to twelfth embodiments according to the present technology as long as there is no particular technical inconsistency.

15. Fourteenth Embodiment (Example 1 of Display Device)

The display device of the fourteenth embodiment (Example 1 of the display device) according to the present technology is a display device that includes a frame attached to a head of a user, an image projection device attached to the frame, and an image display device attached to an eyeball surface and displays an image on a retina by projecting a display image (display light or image display light may be used) projected from the image projection device onto the image display device.

The above-described image display device may be the image display device of any one embodiment among the image display device of the first embodiment according to the present technology to the image display device of the thirteenth embodiment according to the present technology. The image projection device may include, for example, a two-dimensional array display element and two lenses, or may include a light source, a scanning mirror, and one lens.

Note that the embodiments according to the present technology are not limited to the above-described embodiments, and various modifications can be made without departing from the gist of the present technology.

In addition, the effects described in the present specification are merely illustrative and not restrictive, and other effects may be provided.

Furthermore, the present technology can also have the following configurations.

[1]

An image display device including:
  at least one optical element unit including two optical elements facing each other,
  in which one optical element unit included in the at least one optical element unit includes a first optical element and a second optical element,
  an image is formed on the basis of image display light which transmits through the first optical element and is emitted to outside of the image display device,
  the first optical element has a deflection function of deflecting incident light which has a predetermined wavelength and is incident on the first optical element at a predetermined incidence angle to a side of the first optical element on which the incident light is incident, and emits first diffracted light deflected by the deflection function,
  the second optical element has a lens function for the first diffracted light which has a predetermined wavelength and is incident on the second optical element at a predetermined incidence angle, and
  a direction of the incidence angle of the incident light and a direction of a diffraction angle of the first diffracted light are different from a direction of an optical axis of the second optical element.

[2]

The image display device according to [1],
  in which, in a three-dimensional coordinate system, a normal line of the first optical element is in a +z axis direction from an origin of the three-dimensional coordinate system,
  a surface of the first optical element is an x-y plane,
  the incident light which is incident on the first optical element is light which extends from a certain point within a second quadrant range, within a third quadrant range, or on a −x axis of an x-y coordinate system in the +z axis direction to the origin of the three-dimensional coordinate system, and
  the first diffracted light which is emitted from the first optical element is light which extends from the origin of the three-dimensional coordinate system to a certain point within a first quadrant range, within a fourth quadrant range, on a +x axis, on a +y axis, or on a −y axis of the x-y coordinate system in the +z axis direction.

[3]

The image display device according to [1],
  in which, in a three-dimensional coordinate system, a normal line of the first optical element is in a +z axis direction from an origin of the three-dimensional coordinate system,
  a surface of the first optical element is an x-y plane,
  the incident light which is incident on the first optical element is light which extends from a certain point within a second quadrant range, within a third quadrant range, or on a −x axis of an x-y coordinate system in the +z axis direction to the origin of the three-dimensional coordinate system, and
  the first diffracted light which is emitted from the first optical element is light which extends from the origin of the three-dimensional coordinate system to a certain point within a second quadrant range, within a third quadrant range, or on a −x axis of the x-y coordinate system in the +z axis direction.

[4]

The image display device according to any one of [1] to [3],
  in which the first optical element has a lens function for the incident light which has the predetermined wavelength and is incident on the first optical element at the predetermined incidence angle.

[5]

The image display device according to any one of [1] to [4],
  in which each of the first optical element and the second optical element has a curved surface shape.

[6]

The image display device according to any one of [1] to [5],
  in which the first optical element and the second optical element are disposed close to each other.

[7]

The image display device according to any one of [1] to [5],
  in which the first optical element and the second optical element are disposed in contact with each other.

[8]

The image display device according to any one of [1] to [7], further including:
  a substrate,
  in which the substrate is in contact with the first optical element, and
  light propagated within the substrate is incident on the first optical element.

[9]

The image display device according to [8],
  in which the substrate is a light guide plate, and
  light reflected and propagated within the light guide plate is incident on the first optical element.

[10]

The image display device according to any one of [1] to [9],
  in which the second optical element has a deflection function of deflecting the first diffracted light which has a predetermined wavelength and is incident on the second optical element at a predetermined incidence angle to a side of the second optical element on which the first diffracted light is incident.

[11]

The image display device according to any one of [1] to [10],
  in which each of the incidence angle of the incident light which is incident on the first optical element and the diffraction angle of the first diffracted light which is emitted from the first optical element is larger than a traveling angle of a light beam according to the second optical element having a lens function.

[12]

The image display device according to any one of [1] to [11],
  in which the second optical element has a deflection function of deflecting the first diffracted light which has a predetermined wavelength and is incident on the second optical element at a predetermined incidence angle to a side of the second optical element on which the first diffracted light is incident, and the incidence angle of the incident light which is incident on the first optical element is different from each of an incidence angle of the first diffracted light which is incident on the second optical element and a diffraction angle of the second diffracted light which is deflected by the deflection function of the second optical element and is emitted from the second optical element.

[13]

The image display device according to any one of [1] to [12], in which at least one of a direction of the incidence angle of the incident light which is incident on the first optical element or a direction of the diffraction angle of the first diffracted light which is emitted from the first optical element is a direction of a forehead, a nose, or a glabella of a user.

[14]

The image display device according to any one of [1] to [13], in which each of the first optical element and the second optical element is any one optical element of a volume-type hologram optical element, a diffraction grating optical element, and a meta-surface optical element.

[15]

An image display device including:

at least one optical element unit including at least three optical elements facing each other, in which one optical element unit included in the at least one optical element unit includes a first optical element, a second optical element, and a third optical element, an image is formed on the basis of image display light which transmits through the first optical element and is emitted to outside of the image display device, the first optical element has a deflection function of deflecting incident light which has a predetermined wavelength and is incident on the first optical element at a predetermined incidence angle to a side of the first optical element on which the incident light is incident, and emits first diffracted light deflected by the deflection function, the third optical element has a deflection function of deflecting the first diffracted light which has a predetermined wavelength and is incident on the third optical element at a predetermined incidence angle to a side of the third optical element on which the first diffracted light is incident, and emits third diffracted light deflected by the deflection function, the second optical element has a lens function for the third diffracted light which has a predetermined wavelength and is incident on the second optical element at a predetermined incidence angle, and a direction of the incidence angle of the incident light and a direction of a diffraction angle of the first diffracted light are different from a direction of a diffraction angle of the third diffracted light.

[16]

The image display device according to [15], in which the second optical element has a deflection function of deflecting the third diffracted light which has a predetermined wavelength, transmits through the first optical element, and is incident on the second optical element at a predetermined incidence angle to a side opposite to a side of the second optical element on which the third diffracted light is incident, and emits fourth diffracted light deflected by the deflection function as the image display light.

[17]

The image display device according to [15] or [16], in which each of the first optical element, the second optical element, and the third optical element is any one optical element of a volume-type hologram optical element, a diffraction grating optical element, and a meta-surface optical element.

[18]

A display device including:

a frame mounted on a head of a user;

an image projection device attached to the frame; and the image display device according to any one of [1] to [17] that is attached to an eyeball surface, in which the display device displays an image on a retina by projecting a display image projected from the image projection device onto the image display device.

REFERENCE SIGNS LIST

1(1-1, 1-2), 2, 3(3-1, 3-2), 4(4-1, 4-2), 5, 6, 7, 8, 9, 10, 11, 12, 13(13-1, 13-2) Image display device
10, 10-1 First optical element
20, 20-1 Second optical element
30 Third optical element
500 Light guide plate
600 First protective layer
700 Second protective layer

The invention claimed is:

1. An image display device, comprising:
at least one optical element unit including two optical elements facing each other,
wherein one optical element unit included in the at least one optical element unit includes a first optical element and a second optical element,
an image is formed on a basis of image display light which transmits through the first optical element and is emitted to outside of the image display device,
the first optical element has a deflection function of deflecting incident light which has a predetermined wavelength and is incident on the first optical element at a predetermined incidence angle to a side of the first optical element on which the incident light is incident, and emits first diffracted light deflected by the deflection function,
the second optical element has a lens function for the first diffracted light which has a predetermined wavelength and is incident on the second optical element at a predetermined incidence angle, and
a direction of the predetermined incidence angle of the incident light and a direction of a diffraction angle of the first diffracted light are different from a direction of an optical axis of the second optical element.

2. The image display device according to claim 1,
wherein, in a three-dimensional coordinate system, a normal line of the first optical element is in a +z axis direction from an origin of the three-dimensional coordinate system,
a surface of the first optical element is an x-y plane,
the incident light which is incident on the first optical element is light which extends from a certain point within a second quadrant range, within a third quadrant range, or on a −x axis of an x-y coordinate system in the +z axis direction to the origin of the three-dimensional coordinate system, and the first diffracted light which is emitted from the first optical element is light which extends from the origin of the three-dimensional coordinate system to a certain point within a first quadrant range, within a fourth quadrant range, on a +x axis, on a +y axis, or on a −y axis of the x-y coordinate system in the +z axis direction.

3. The image display device according to claim 1, wherein, in a three-dimensional coordinate system, a normal line of the first optical element is in a +z axis direction from an origin of the three-dimensional coordinate system, a surface of the first optical element is an x-y plane, the incident light which is incident on the first optical element is light which extends from a certain point within a second quadrant range, within a third quadrant range, or on a −x axis of an x-y coordinate system in the +z axis direction to the origin of the three-dimensional coordinate system, and the first diffracted light which is emitted from the first optical element is light which extends from the origin of the three-dimensional coordinate system to a certain point within the second quadrant range, within the third quadrant range, or on the −x axis of the x-y coordinate system in the +z axis direction.

4. The image display device according to claim 1, wherein the first optical element has a lens function for the incident light which has the predetermined wavelength and is incident on the first optical element at the predetermined incidence angle.

5. The image display device according to claim 1, wherein each of the first optical element and the second optical element has a curved surface shape.

6. The image display device according to claim 1, wherein the first optical element and the second optical element are disposed close to each other.

7. The image display device according to claim 1, wherein the first optical element and the second optical element are disposed in contact with each other.

8. The image display device according to claim 1, further comprising:

a substrate, wherein the substrate is in contact with the first optical element, and light propagated within the substrate is incident on the first optical element.

9. The image display device according to claim 8, wherein the substrate is a light guide plate, and light reflected and propagated within the light guide plate is incident on the first optical element.

10. The image display device according to claim 1, wherein the second optical element has a deflection function of deflecting the first diffracted light which has the predetermined wavelength and is incident on the second optical element at the predetermined incidence angle to a side of the second optical element on which the first diffracted light is incident.

11. The image display device according to claim 1, wherein each of the predetermined incidence angle of the incident light which is incident on the first optical element and the diffraction angle of the first diffracted light which is emitted from the first optical element is larger than a traveling angle of a light beam according to the second optical element having the lens function.

12. The image display device according to claim 1, wherein the second optical element has a deflection function of deflecting the first diffracted light which has the predetermined wavelength and is incident on the second optical element at the predetermined incidence angle to a side of the second optical element on which the first diffracted light is incident, and the predetermined incidence angle of the incident light which is incident on the first optical element is different from each of the predetermined incidence angle of the first diffracted light which is incident on the second optical element and a diffraction angle of second diffracted light which is deflected by the deflection function of the second optical element and is emitted from the second optical element.

13. The image display device according to claim 1, wherein at least one of the direction of the predetermined incidence angle of the incident light which is incident on the first optical element or the direction of the diffraction angle of the first diffracted light which is emitted from the first optical element is a direction of a forehead, a nose, or a glabella of a user.

14. The image display device according to claim 1, wherein each of the first optical element and the second optical element is any one optical element of a volume-type hologram optical element, a diffraction grating optical element, and a meta-surface optical element.

15. An image display device, comprising:

at least one optical element unit including at least three optical elements facing each other, wherein one optical element unit included in the at least one optical element unit includes a first optical element, a second optical element, and a third optical element, an image is formed on a basis of image display light which transmits through the first optical element and is emitted to outside of the image display device, the first optical element has a deflection function of deflecting incident light which has a predetermined wavelength and is incident on the first optical element at a predetermined incidence angle to a side of the first optical element on which the incident light is incident, and emits first diffracted light deflected by the deflection function, the third optical element has a deflection function of deflecting the first diffracted light which has a predetermined wavelength and is incident on the third optical element at a predetermined incidence angle to a side of the third optical element on which the first diffracted light is incident, and emits third diffracted light deflected by the deflection function, the second optical element has a lens function for the third diffracted light which has a predetermined wavelength and is incident on the second optical element at a predetermined incidence angle, and a direction of the predetermined incidence angle of the incident light and a direction of a diffraction angle of the first diffracted light are different from a direction of a diffraction angle of the third diffracted light.

16. The image display device according to claim 15, wherein the second optical element has a deflection function of deflecting the third diffracted light which has the predetermined wavelength, transmits through the first optical element, and is incident on the second optical element at the predetermined incidence angle to a side opposite to a side of the second optical element on which the third diffracted light is incident, and emits fourth diffracted light deflected by the deflection function as the image display light.

17. The image display device according to claim 15, wherein each of the first optical element, the second optical element, and the third optical element is any one optical element of a volume-type hologram optical element, a diffraction grating optical element, and a meta-surface optical element.

18. A display device, comprising:
a frame mounted on a head of a user;
an image projection device attached to the frame; and
the image display device according to claim 1 that is attached to an eyeball surface,
wherein the display device displays an image on a retina by projecting a display image projected from the image projection device onto the image display device.

19. A display device, comprising:
a frame mounted on a head of a user;
an image projection device attached to the frame; and
the image display device according to claim 15 that is attached to an eyeball surface,
wherein the display device displays an image on a retina by projecting a display image projected from the image projection device onto the image display device.

* * * * *